United States Patent
Onuma et al.

(10) Patent No.: US 8,087,488 B2
(45) Date of Patent: Jan. 3, 2012

(54) STEERING APPARATUS FOR VEHICLE THAT DETECTS AN ANOMALY OF THE CONNECTING-DISCONNECTING DEVICE BETWEEN THE STEERING WHEEL AND THE TURNABLE WHEELS

(75) Inventors: Yutaka Onuma, Nishigamo-gun (JP); Yuichi Onoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1113 days.

(21) Appl. No.: 11/911,673

(22) PCT Filed: Dec. 28, 2006

(86) PCT No.: PCT/JP2006/326417
§ 371 (c)(1),
(2), (4) Date: Oct. 16, 2007

(87) PCT Pub. No.: WO2007/105351
PCT Pub. Date: Sep. 20, 2007

(65) Prior Publication Data
US 2009/0055050 A1    Feb. 26, 2009

(30) Foreign Application Priority Data
Mar. 14, 2006   (JP) .................................. 2006-069568

(51) Int. Cl.
B62D 5/04    (2006.01)

(52) U.S. Cl. ........................ 180/404; 180/402; 701/43

(58) Field of Classification Search ............... 180/402, 180/404, 405, 407; 701/43
See application file for complete search history.

(56) References Cited

U.S. PATENT DOCUMENTS

| | | | |
|---|---|---|---|
| 5,271,474 A * | 12/1993 | Nishimoto et al. | 180/446 |
| 5,295,550 A | 3/1994 | Chikuma | |
| 6,394,218 B1 | 5/2002 | Heitzer | |
| 6,580,989 B1 | 6/2003 | Husain et al. | |
| 6,612,393 B2 | 9/2003 | Bohner et al. | |
| 7,004,279 B2 | 2/2006 | Shitamitsu et al. | |
| 7,308,964 B2 * | 12/2007 | Hara et al. | 180/446 |
| 7,698,035 B2 * | 4/2010 | Chino et al. | 701/41 |
| 2002/0092696 A1 | 7/2002 | Bohner et al. | |
| 2005/0037884 A1 | 2/2005 | Hermann et al. | |
| 2005/0071061 A1 | 3/2005 | Kato et al. | |
| 2005/0072621 A1 * | 4/2005 | Hara et al. | 180/444 |
| 2005/0155809 A1 | 7/2005 | Krzesicki et al. | |
| 2005/0279562 A1 * | 12/2005 | Hara et al. | 180/402 |
| 2006/0042859 A1 | 3/2006 | Itoh | |
| 2006/0169519 A1 * | 8/2006 | Osonoi et al. | 180/402 |
| 2006/0200290 A1 * | 9/2006 | Chino et al. | 701/41 |

FOREIGN PATENT DOCUMENTS

DE    100 39 170 A1    6/2001

(Continued)

*Primary Examiner* — Paul N Dickson
*Assistant Examiner* — Wesley Potter
(74) *Attorney, Agent, or Firm* — Oblon, Spivak, McClelland, Maier & Neustadt, L.L.P.

(57) ABSTRACT

A steering-by-wire-type steering apparatus for a vehicle which can detect an anomaly of a connecting-disconnecting device which selectively connects and disconnects an input member on a steering wheel side and an output member on a turnable wheel side based on a steering input operation quantity or a steering state quantity.

13 Claims, 18 Drawing Sheets

FOREIGN PATENT DOCUMENTS

| | | |
|---|---|---|
| DE | 101 01 827 A1 | 7/2002 |
| DE | 101 35 736 C1 | 4/2003 |
| DE | 101 60 717 A1 | 6/2003 |
| EP | 1 630 069 A2 | 3/2006 |
| EP | 1 630 069 A3 | 3/2006 |
| JP | 4-67178 | 6/1992 |
| JP | 7 149247 | 6/1995 |
| JP | 7-149247 | 6/1995 |
| JP | 2000-62632 | 2/2000 |
| JP | 2000-184774 | 6/2000 |
| JP | 2001-301639 | 10/2001 |
| JP | 2001 301639 | 10/2001 |
| JP | 2002-145098 | 5/2002 |
| JP | 2003-182622 | 7/2003 |
| JP | 2003 267249 | 9/2003 |
| JP | 2004-58743 | 2/2004 |
| JP | 2004-90784 | 3/2004 |
| JP | 2004-210200 | 7/2004 |
| JP | 2004 351975 | 12/2004 |
| JP | 2002 145098 | 5/2005 |
| WO | WO 2004/065195 A1 | 8/2004 |

\* cited by examiner (a)

(b)

(c)

OCCURRENCE OF SELF STEER

STEERING APPARATUS FOR VEHICLE THAT DETECTS AN ANOMALY OF THE CONNECTING-DISCONNECTING DEVICE BETWEEN THE STEERING WHEEL AND THE TURNABLE WHEELS

TECHNICAL FIELD

The present invention relates to a steering-by-wire-type steering apparatus for a vehicle.

BACKGROUND ART

Conventionally, there have been well known a steering apparatus for a vehicle which employs a steering-by-wire-type system in which a steering wheel and turnable wheels are mechanically separated and in which an electrical actuator provided on the turnable-wheel side is operated and controlled in accordance with a steering operation of the steering wheel to thereby turn the turnable wheels, and at the same time, an electrical actuator provided on the steering wheel side is operated and controlled in accordance with the steering operation of the steering wheel to thereby apply a steering reaction to the steering wheel. As shown in, for example, Japanese Patent Application Laid-Open (kokai) No. 2001-301639, in a steering apparatus of such a type, in order to secure turning of the turnable wheels in accordance with the steering operation of the steering wheel even when the electrical actuator for turning is anomalous, an electromagnetic clutch is disposed between an input member connected to the steering wheel side and an output member connected to the turnable wheel side. In an ordinary state, the electromagnetic clutch is set in a disconnected state so as to separate the input and output members. When the electrical actuator for turning is anomalous, the electromagnetic clutch is set in a connected state to as to connect the input and output members. Japanese Patent Application Laid-Open No. 2001-301639 also discloses a configuration in which an intermediate member is provided between the input and output members, a first electromagnetic clutch is disposed between the input member and the intermediate member, and a second electromagnetic clutch is disposed between the intermediate member and the output member.

However, the above-described Patent Document 1 does not contain any description on detection of anomaly of the electromagnetic clutches, although it contains a description on detection of anomaly of the electrical actuators.

BRIEF SUMMARY OF THE INVENTION

The present invention has been accomplished to solve the above-described problem, and an object of the present invention is to provide a steering-by-wire-type steering apparatus for a vehicle which can readily and inerrably detect anomaly of a connecting-disconnecting device which selectively connects and disconnects an input member on a steering wheel side and an output member on a turnable wheel side.

In order to achieve the above-object, the present invention provides a steering-by-wire-type steering apparatus for a vehicle, comprising an input member connected to a steering wheel and displacing interlockedly with the steering wheel; an output member connected to turnable wheels and displacing interlockedly with the turnable wheels; a first electrical actuator connected to the input member and controlling displacement of the input member; a second electrical actuator connected to the output member and controlling displacement of the output member; and a connecting-disconnecting device disposed between the input member and the output member, the connecting-disconnecting device being brought into a disconnected state so as to separate the input member and the output member to thereby prevent power transmission therebetween, or into a connected state so as to connect the input member and the output member to thereby permit power transmission therebetween, the steering-by-wire-type steering apparatus being characterized by comprising anomaly detection means for detecting an anomaly of the connecting-disconnecting device on the basis of a predetermined operation quantity which is input to the input member as a result of operation of the steering wheel by a driver, the operation quantity changing in accordance with the relation of relative displacement between the input member and the output member.

In this case, preferably, the anomaly detection means detects an anomaly of the connecting-disconnecting device on the basis of an operation force with which the driver operates the steering wheel, the operation force being an operation quantity which is input by the driver to the input member via the steering wheel, and changing in accordance with the relation of relative displacement between the input member and the output member. In this case, preferably, the anomaly detection means comprises displacement amount detection means for detecting a displacement amount of the input member which displaces in accordance with operation of the steering wheel by the driver; operation force detection means for detecting an operation force which is input by the driver to the input member via the steering wheel; displacement amount determination means for determining whether or not the displacement amount detected by the displacement amount detection means is equal to or less than a previously set, predetermined displacement amount; stop control means for stopping operation of the second electrical actuator connected to the output member when the displacement amount determination means determines that the detected displacement amount is equal to or less than the predetermined displacement amount; operation force determination means for determining whether or not the operation force detected by the operation force detection means in a state where the operation of the second electrical actuator is stopped by the stop control means is greater than a target operation force previously set in accordance with the relation of relative displacement between the input member and the output member; and anomaly determination means for determining an anomaly of the connecting-disconnecting device on the basis of results of the determination by the operation force determination means.

According to the feature of the prevent invention having the above-described configuration, when the connecting-disconnecting device is in a disconnected state, the input member displaces as a result of operation of the steering wheel by the driver and operation of the first electrical actuator, and the output member displaces as a result of operation of the second electrical actuator. That is, when the connecting-disconnecting device is in a disconnected state, the input member and the output member displace independently of each other. Meanwhile, when the connecting-disconnecting device is in a connected state, the input member and the output member displace together. When the driver operates the steering wheel in this state, he must displace the input member and the output member together, and the operation quantity input by the driver (e.g., operation force for operating the steering wheel) differs from an operation quantity (operation force) at the time when the connecting-disconnecting device is in a disconnected state. Accordingly, an erroneously disconnected state, where the connecting-disconnecting device maintains a disconnected state irrespective of changeover control, and an erroneously connected state, where the connecting-disconnecting device maintains a connected state irrespective of changeover control; i.e., anomaly of the connecting-disconnecting device, can be simply detected on the basis of the operation quantity which changes in accordance with the relation of relative displacement between the input member and the output member for the disconnected state or the connected state of the connecting-disconnecting device.

In the case where the anomaly detection means is composed of the displacement amount detection means, the operation force detection means, the displacement amount determination means, the stop control means, the operation force determination means, and the anomaly determination means, anomaly of the connecting-disconnecting device can be detected more inerrably and simply by determining the operation force in the state where the operation of the second electrical actuator is stopped. Further, this anomaly determination is performed when the displacement amount of the input member (steering wheel) is equal to or less than a predetermined displacement amount. Since the steering wheel can be operated even during the anomaly determination, anomaly of the connecting-disconnecting device can be detected without giving an unnatural sensation to the driver. In general, this anomaly determination is performed when the driver first operates the steering wheel immediately after an ignition switch is turned on.

The present invention also provides a steering-by-wire-type steering apparatus for a vehicle, comprising an input member connected to a steering wheel and displacing interlockedly with the steering wheel; an output member connected to turnable wheels and displacing interlockedly with the turnable wheels; a first electrical actuator connected to the input member and controlling displacement of the input member; a second electrical actuator connected to the output member and controlling displacement of the output member; and a connecting-disconnecting device disposed between the input member and the output member, the connecting-disconnecting device being brought into a disconnected state so as to separate the input member and the output member to thereby prevent power transmission therebetween, or into a connected state so as to connect the input member and the output member to thereby permit power transmission therebetween, the steering-by-wire-type steering apparatus being characterized by comprising anomaly detection means for detecting an anomaly of the connecting-disconnecting device on the basis of a state quantity which represents a state where power generated upon operation of the second electrical actuator is transmitted to the input member via the output member.

According to the feature of the prevent invention having the above-described configuration, when the connecting-disconnecting device is in a disconnected state, power generated upon operation of the second electrical actuator is not transmitted from the output member to the input member. Therefore, the input member has an independent state quantity related to displacement (e.g., displacement amount, displacement speed, displacement acceleration, external force, etc.) due to operation of the steering wheel by the driver or operation of the first electrical actuator, and the output member and the turnable wheels connected to the output member each have an independent state quantity related to displacement (e.g., turning amount, turning speed, turning acceleration, etc.) due to operation of the second electrical actuator. Meanwhile, when the connecting-disconnecting device is in a connected state, the input member and the output member have a common state quantity related to displacement and reflecting operation of the second electrical actuator. Accordingly, an anomaly in which the connecting-disconnecting device maintains an erroneously disconnected state irrespective of changeover control and an anomaly in which the connecting-disconnecting device maintains an erroneously connected state irrespective of changeover control can be detected simply from the state quantity related to displacements of the input member and the output member for the disconnected state or the connected state of the connecting-disconnecting device. Further, in general, this anomaly determination is performed while the vehicle is traveling. Accordingly, anomaly of the connecting-disconnecting device can be always detected.

In this case, preferably, the anomaly detection means comprises displacement amount detection means for detecting a displacement amount of the input member; calculation means for calculating, as the state quantity, at least one of a displacement speed and a displacement acceleration of the input member from the displacement amount detected by the displacement amount detection means, the displacement speed representing a value obtained by differentiating the detected displacement amount with respect to time, and the displacement acceleration representing a value obtained by differentiating the displacement speed with respect to time; determination means for determining whether or not at least one of the displacement speed and the displacement acceleration calculated by the calculation means is equal to or greater than a previously set predetermined value; and anomaly determination means for determining an anomaly of the connecting-disconnecting device on the basis of results of the determination by the determination means. With this configuration, anomaly of the connecting-disconnecting device can be determined simply and quickly through comparison between at least one of the displacement speed and displacement acceleration of the input member and a predetermined value (e.g., a predetermined displacement speed or a predetermined displacement acceleration).

In this case, preferably, the anomaly detection means comprises external force detection means for detecting, as the state quantity, an external force input to the input member; external force change determination means for determining whether or not the external force detected by the external force detection means has sharply decreased; and anomaly determination means for determining an anomaly of the connecting-disconnecting device on the basis of results of the determination by the external force change determination means. Further, preferably, the anomaly detection means comprises displacement amount detection means for detecting a displacement amount of the input member; operation force detection means for detecting, as the state quantity, an operation force input by the driver to the input member via the steering wheel; input direction determination means for determining whether or not a displacement direction of the input member and an input direction of the detected operation force differ from each other; and anomaly determination means for determining an anomaly of the connecting-disconnecting device on the basis of results of the determination by the input direction determination means.

By virtue of these configurations, anomaly of the connecting-disconnecting device can be determined on the basis of a sharp drop of the external force input to the input member (e.g., the sum of operation force input by the driver and power input upon operation of the second electrical actuator) or the basis of the changing the input direction of the operation force. That is, when the connecting-disconnecting device enters an erroneously connected state in a state where the driver inputs an operation force to the input member via the steering wheel, power generated by the second electrical actuator is input thereto. At this time, the external force input to the input member decreases sharply due to input of the power (so-called torque drop), or the driver changes the input direction of the operation force in response to a decrease in the external force. Therefore, anomaly of the connecting-disconnecting device can be determined simply on the basis of the external force input to the input member or a change in the input direction of the operation force, and time required for the anomaly determination can be shortened greatly.

Moreover, preferably, the anomaly detection means comprises displacement amount detection means for detecting a displacement amount of the input member as the state quantity; turning amount detection means for detecting a turning amount of the turnable wheels as the state quantity; and anomaly determination means for determining an anomaly of the connecting-disconnecting device on the basis of the displacement amount of the input member detected by the displacement amount detection means and the turning amount of the turnable wheels detected by the turning amount detection means. Further, preferably, the anomaly detection means comprises displacement amount detection means for detecting a displacement amount of the input member; displacement speed calculation means for calculating, as the state quantity, a displacement speed of the input member from the displacement amount of the input member detected by the displacement amount detection means, the displacement speed representing a value obtained by differentiating the displacement amount with respect to time; turning amount detection means for detecting a turning amount of the turnable wheels; turning speed calculation means for calculating, as the state quantity, a turning speed of the turnable wheels from the turning amount of the turning wheels detected by the turning amount detection means, the turning speed representing a value obtained by differentiating the turning amount with respect to time; and anomaly determination means for determining an anomaly of the connecting-disconnecting device on the basis of the displacement speed of the input member calculated by the displacement speed calculation means and the turning speed of the turnable wheels calculated by the turning speed calculation means. Moreover, preferably, the anomaly detection means comprises displacement amount detection means for detecting a displacement amount of the input member; displacement acceleration calculation means for calculating, as the state quantity, a displacement acceleration of the input member from the displacement amount of the input member detected by the displacement amount detection means, the displacement acceleration representing a value obtained by differentiating the displacement amount two times with respect to time; turning amount detection means for detecting a turning amount of the turnable wheels; turning acceleration calculation means for calculating, as the state quantity, a turning acceleration of the turning wheels from the turning amount of the turnable wheels detected by the turning amount detection means, the turning acceleration representing a value obtained by differentiating the turning amount two times with respect to time; and anomaly determination means for determining an anomaly of the connecting-disconnecting device on the basis of the displacement acceleration of the input member calculated by the displacement acceleration calculation means and the turning acceleration of the turnable wheels calculated by the turning acceleration calculation means.

By virtue of these configurations, anomaly of the connecting-disconnecting device can be determined by comparing the displacement amount, displacement speed, and displacement acceleration of the input member and the turning amount, turnable speed, and turnable acceleration of the turnable wheels, respectively. That is, when the connecting-disconnecting device is in a disconnected state, the input member and the turnable wheels connected the output member can displace independently of each other. Therefore, the displacement amount, displacement speed, and displacement acceleration of the input member and the turning amount, turnable speed, and turnable acceleration of the turnable wheels have respective independent values. Meanwhile, when the connecting-disconnecting device is in a connected state, since the input member and the turnable wheels connected the output member are mechanically connected, the displacement amount, displacement speed, and displacement acceleration of the input member and the turning amount, turnable speed, and turnable acceleration of the turnable wheels do not have independent values. Therefore, anomaly of the connecting-disconnecting device can be determined simply through comparison between the displacement amount, displacement speed, and displacement acceleration of the input member and the turning amount, turnable speed, and turnable acceleration of the turnable wheels, and time required for the anomaly determination can be shortened.

Moreover, preferably, the anomaly detection means comprises displacement amount detection means for detecting a displacement amount of the input member; target turning amount calculation means for calculating a target turning amount of the turnable wheels by use of the displacement amount detected by the displacement amount detection means; turning amount detection means for detecting an actual turning amount of the turnable wheels; difference calculation means for calculating, as the state quantity, a difference between the target turning amount calculated by the target turning amount calculation means and the actual turning amount detected by the turning amount detection means; and anomaly determination means for determining an anomaly of the connecting-disconnecting device on the basis of the difference calculated by the difference calculation means. By virtue of this configuration, anomaly of the connecting-disconnecting device can be determined on the basis of the difference between the target turning amount and the actual turning amount of the turnable wheels. That is, in a steering-by-wire-type steering apparatus for a vehicle, the target turning amount can be calculated to nonlinearly increase in relation to the displacement amount of the input member in order to enable a driver to turn the vehicle without changing his grip on the steering wheel. Therefore, when the connecting-disconnecting device is an erroneously connected state, the input member and the turnable wheels connected the output member are mechanically coupled, so that the difference between the calculated target turning amount and the actual turning amount increases. Therefore, anomaly of the connecting-disconnecting device can be determined simply on the basis of the difference between the target turning amount and the actual turning amount, and time required for the anomaly determination can be shortened.

Another feature of the present invention resides in provision of actuator operation control means, operable when the anomaly detection means detects an anomaly which maintains the connecting-disconnecting device in a connected state, for stopping the operation of the second electrical actuator and for operating and controlling the first electrical actuator so as to assist the operation of the steering wheel by the driver.

By virtue of this configuration, when the connecting-disconnecting device maintains an erroneously connected state, operation of the second electrical actuator can be stopped, and the first electrical actuator can be controlled so as to assist the operation of the steering wheel by the driver. Thus, it becomes possible to suppress occurrence of so-called self steer; i.e., a phenomenon in which power produced as a result of operation of the second electrical actuator is transmitted to the steering wheel via the input member. Further, by virtue of the assisting operation of the first electrical actuator, the driver can operate the steering wheel lightly, and turn the turnable wheels easily even when the operation of the second electrical actuator is stopped.

Figure 11:
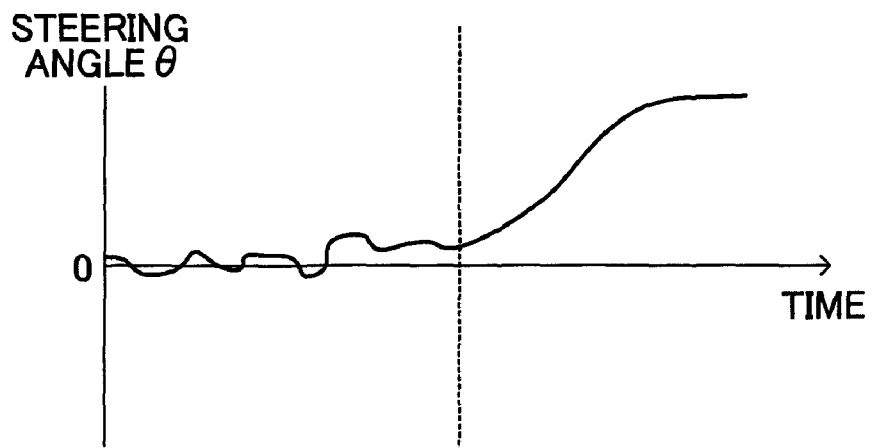
Figure 11:
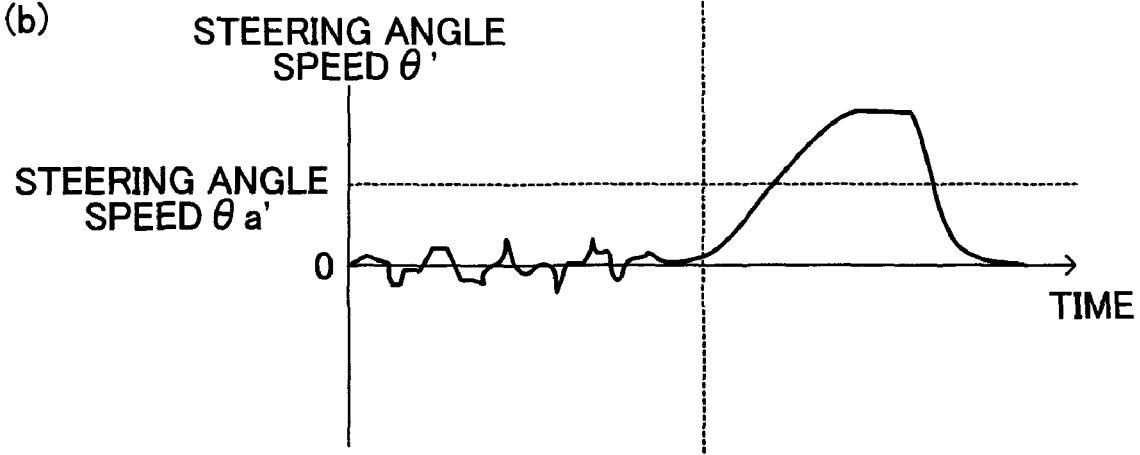
Figure 11:
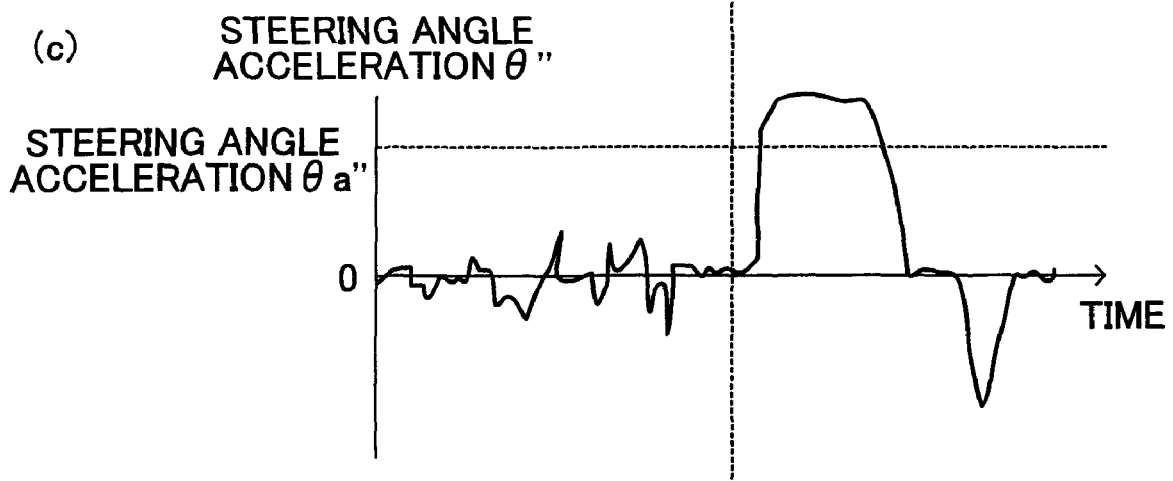

Sections (a), (b), and (c) of FIG. 11 are time charts schematically showing variations in steering angle, steering angle speed, and steering angle acceleration with time, and used for explaining changes in steering angle, steering angle speed, and steering angle acceleration before and after occurrence of self steer.

Figure 12:
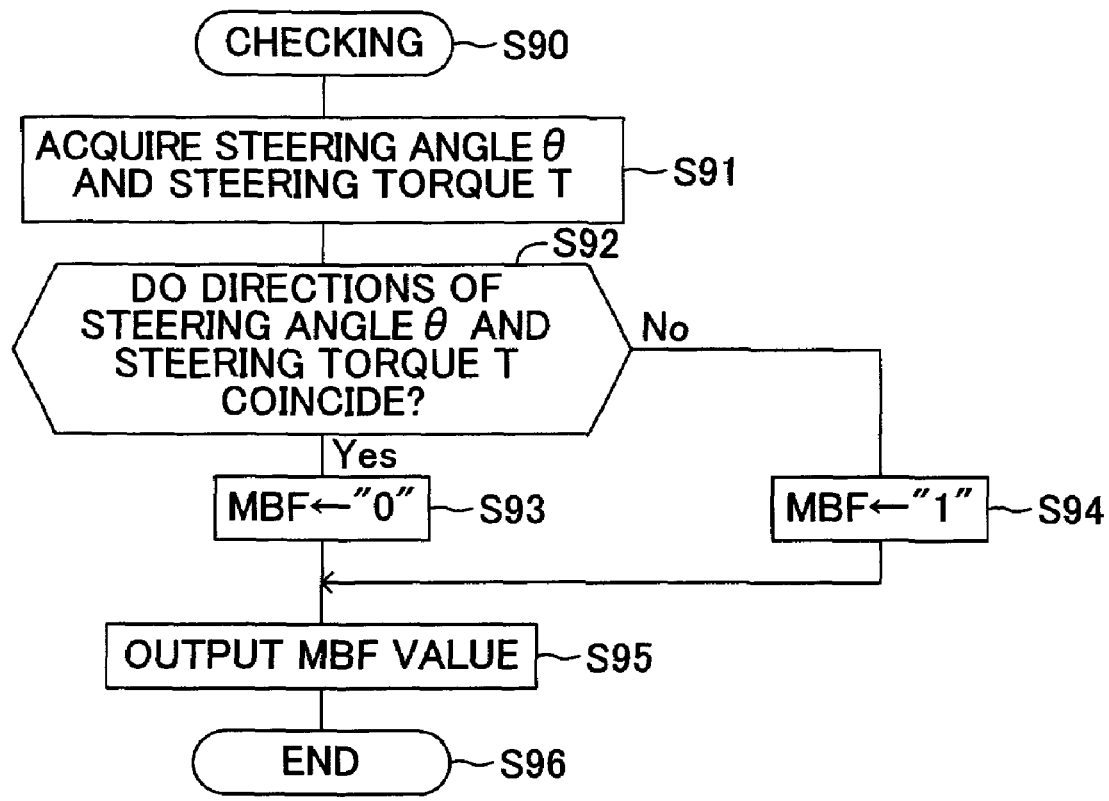

FIG. 12 is a flowchart of a checking program according to a first modification of the second embodiment.

Figure 13:
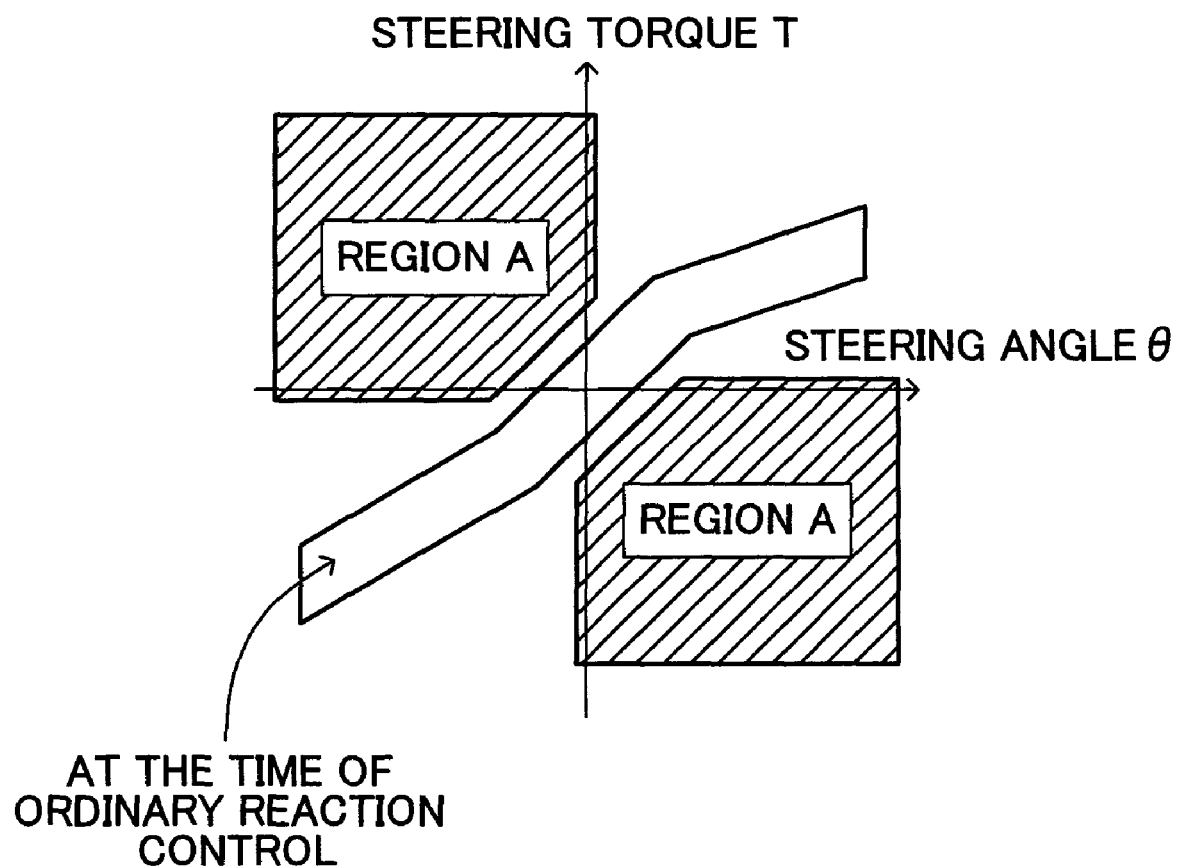

FIG. 13 is a diagram used for explaining the relation between steering angle and steering torque at the time when self steer occurs.

Figure 14:
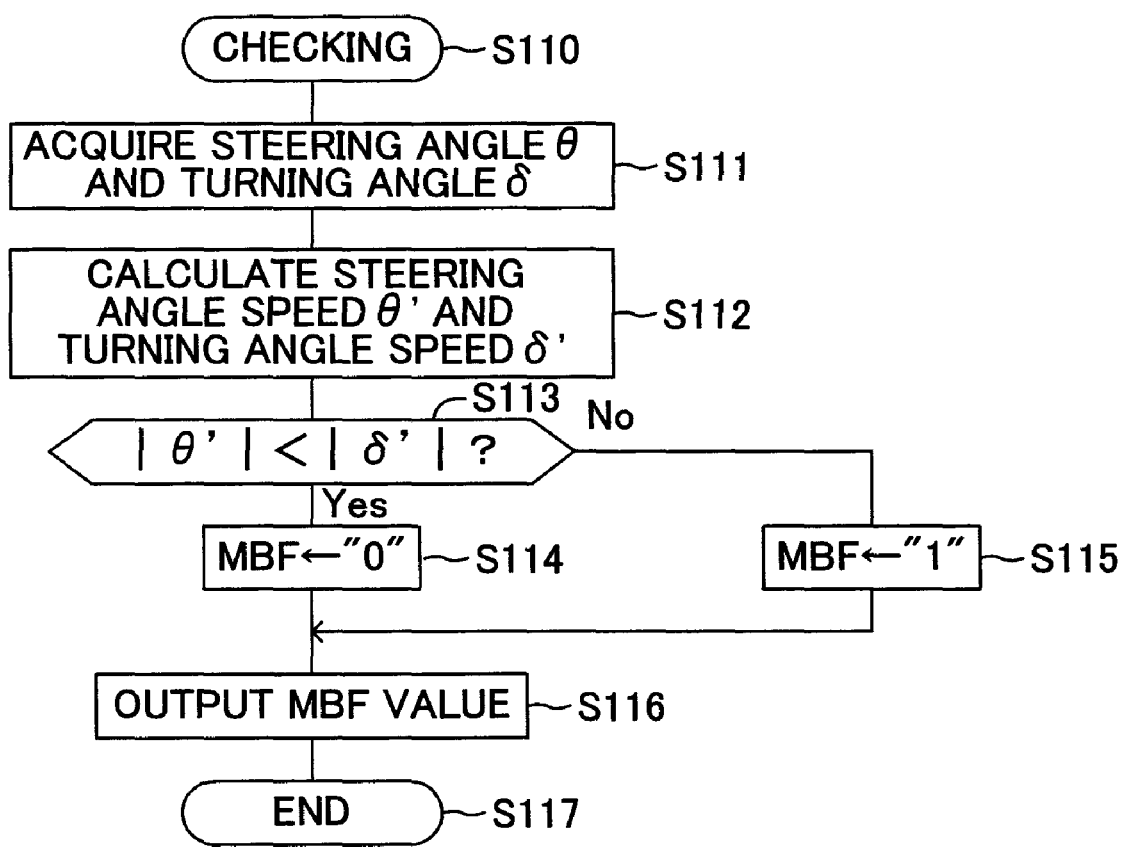

FIG. 14 is a flowchart of a checking program according to a second modification of the second embodiment.

Figure 15:
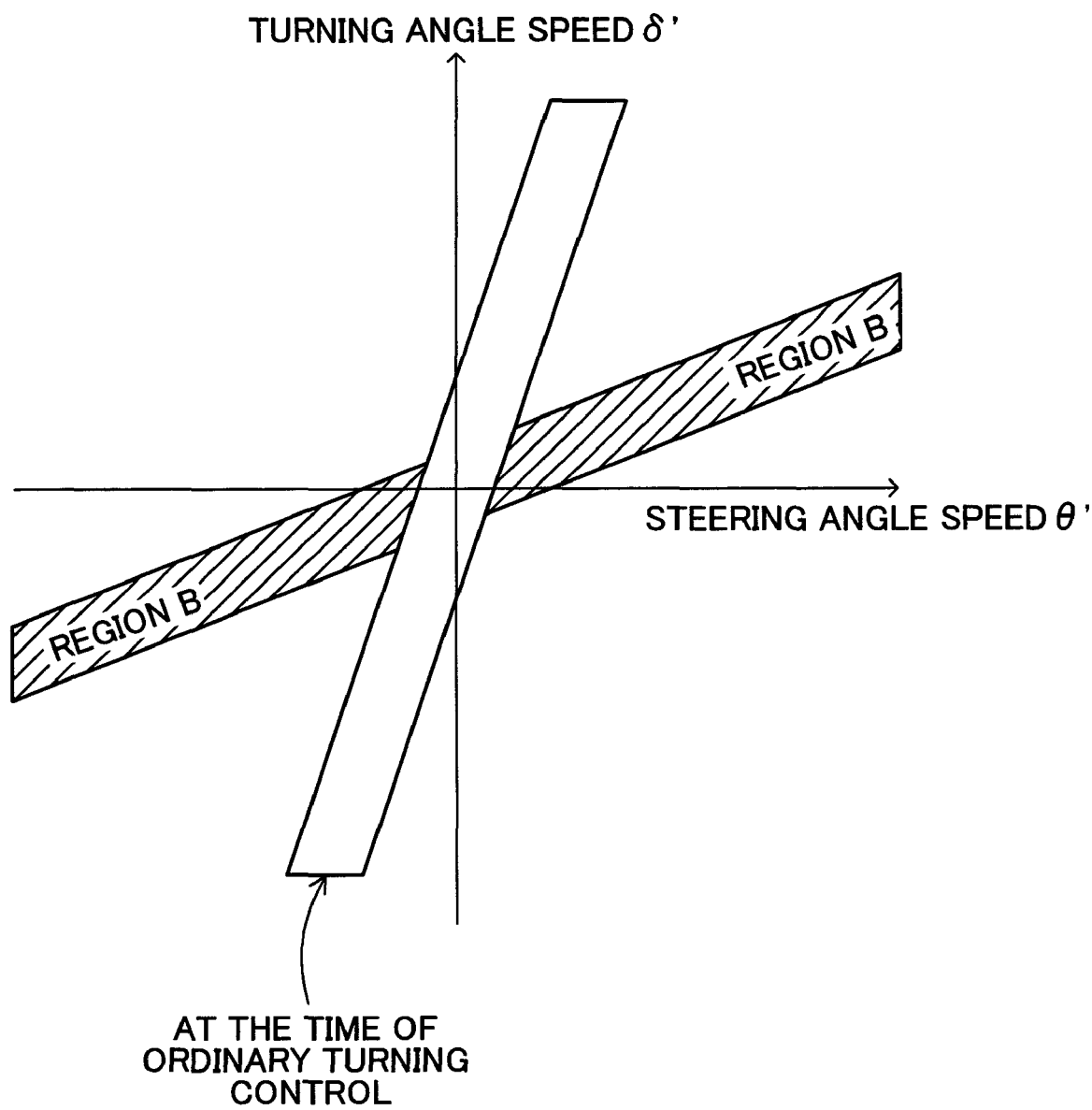

FIG. 15 is a diagram used for explaining the relation between steering angle speed and turning angle speed at the time when self steer occurs.

Figure 16:
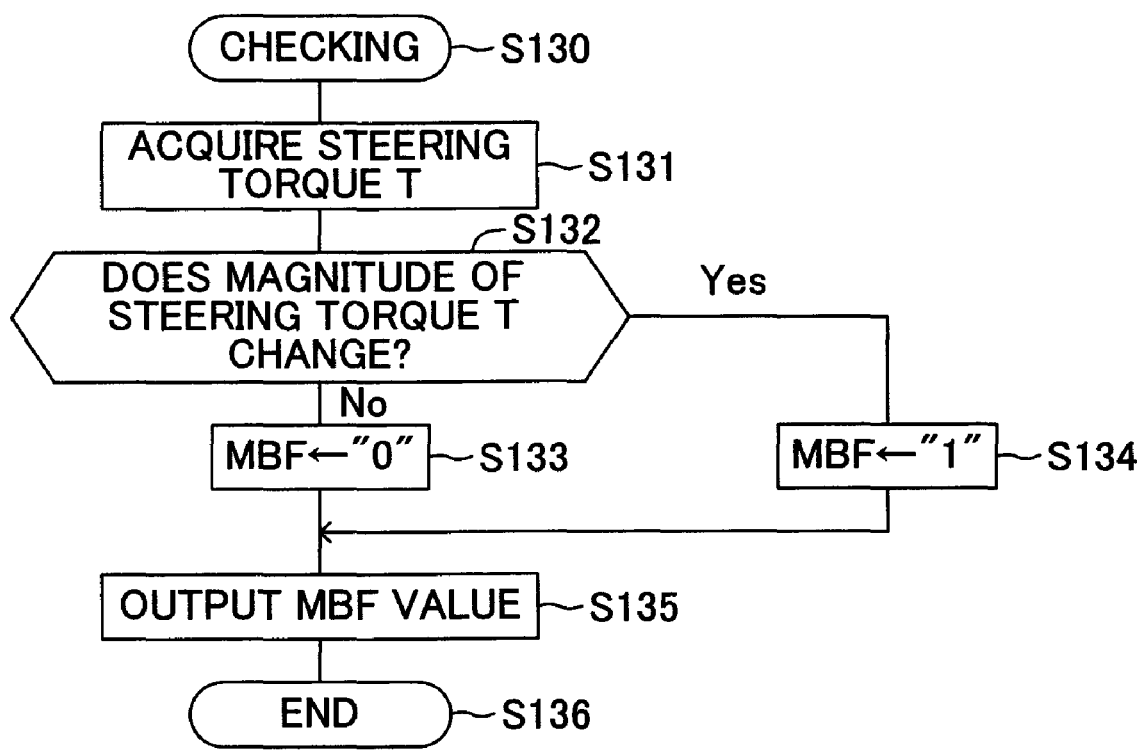

FIG. 16 is a flowchart of a checking program according to a third modification of the second embodiment.

Figure 17:
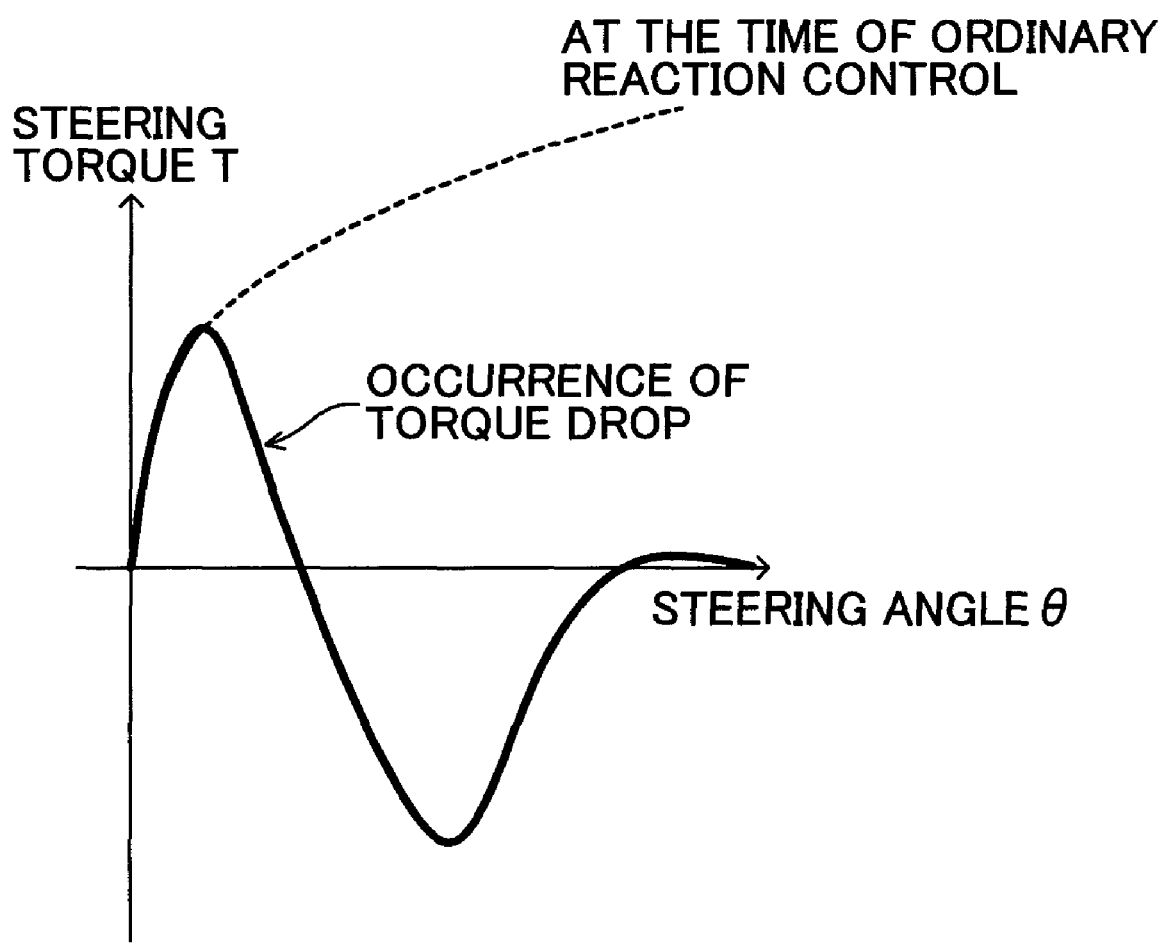

FIG. 17 is a diagram used for explaining the relation between steering angle and steering torque at the time when self steer occurs.

Figure 18:
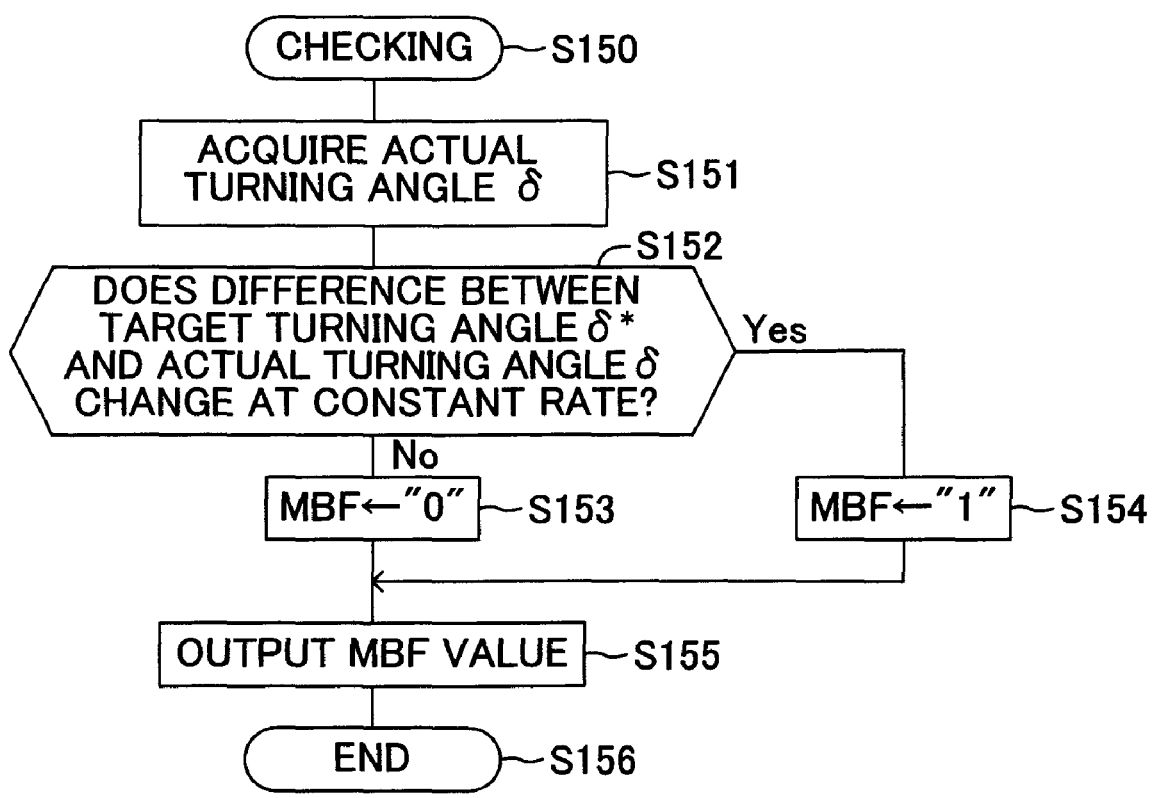

FIG. 18 is a flowchart of a checking program according to a fourth modification of the second embodiment.

Figure 19:
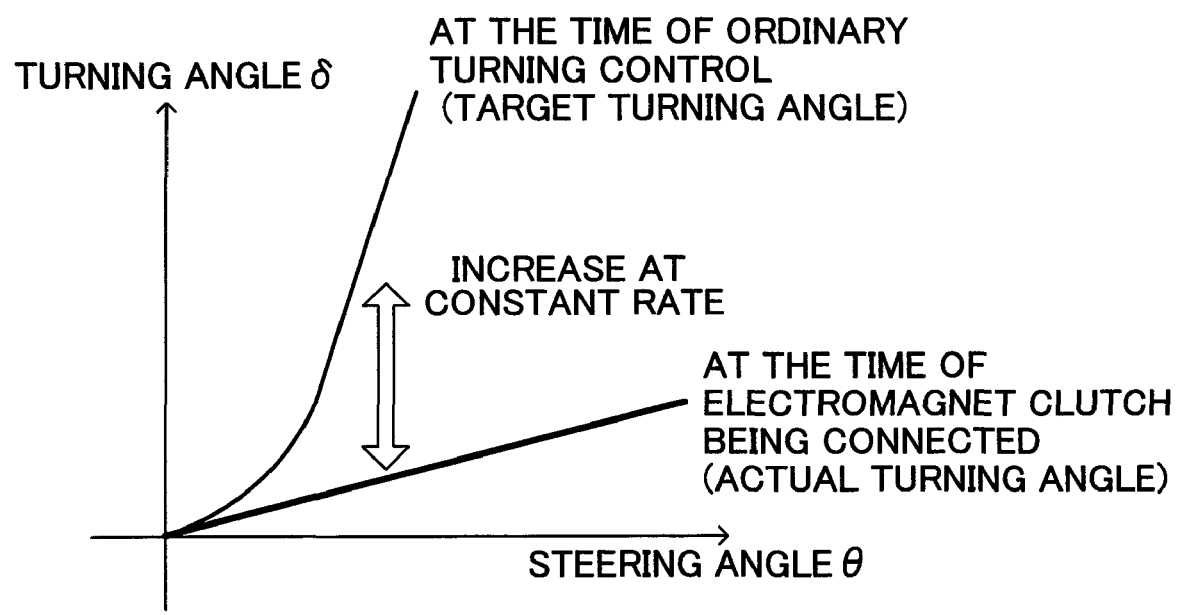

FIG. 19 is a diagram showing the relation between steering angle and turning angle and used for explaining changes in turning angle when an ordinary turning control is performed and when the electromagnetic clutch is connected.

Figure 20:
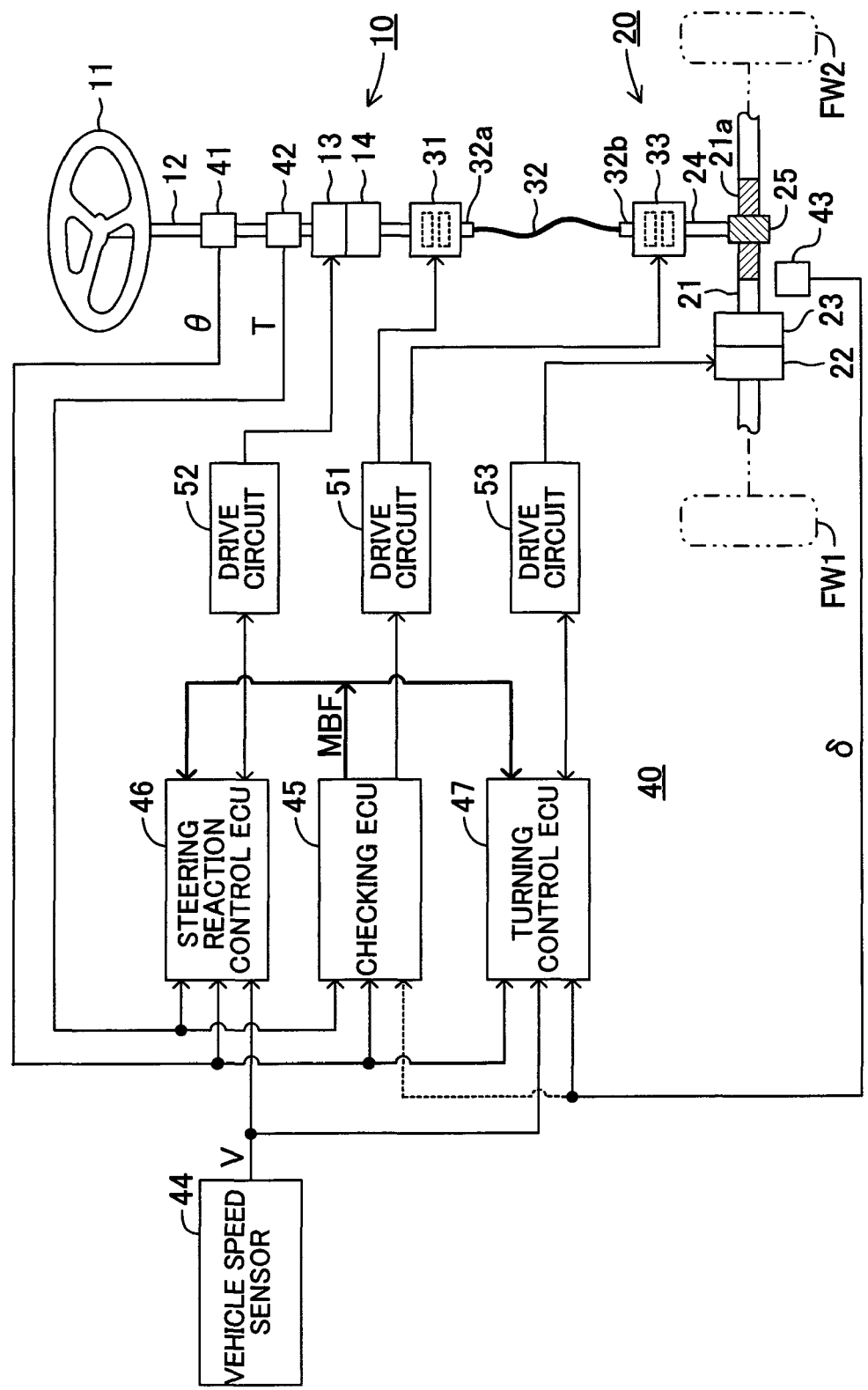

FIG. 20 is an overall schematic diagram of a steering apparatus for a vehicle according to another modification of the present invention.

BEST MODE FOR CARRYING OUT THE INVENTION a) First Embodiment

Figure 1:
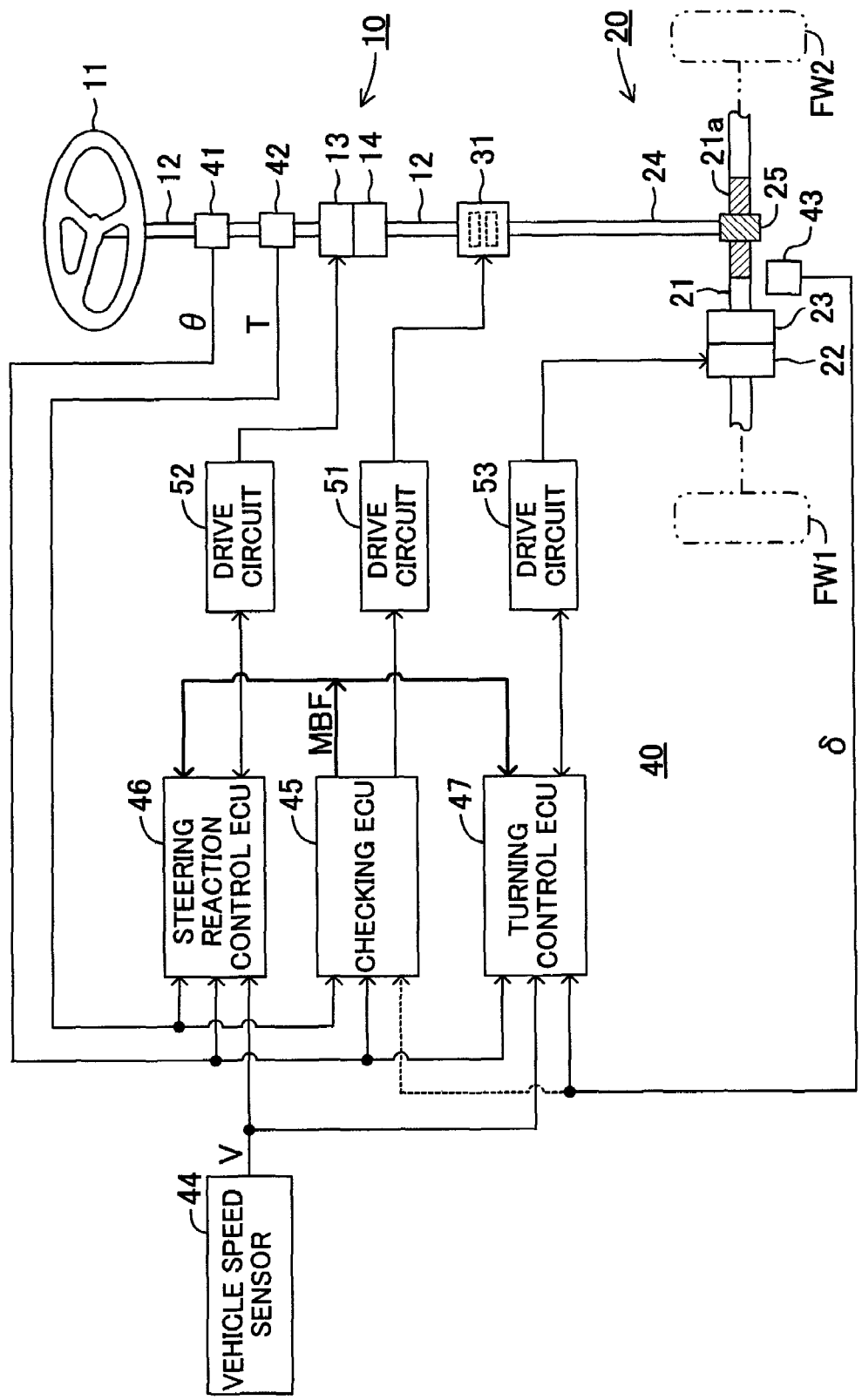
FIG. 1 is an overall schematic diagram of a steering apparatus for a vehicle common among embodiments of the present invention.

Below, a steering apparatus for a vehicle according to a first embodiment of the invention will be described with reference to the drawings. FIG. 1 is an overall schematic diagram showing the steering apparatus for a vehicle according to the first embodiment.

The steering apparatus for a vehicle employs a steering-by-wire system in which a steering operation apparatus 10, which is operated for steering by a driver, is mechanically separated from a turning apparatus 20, which turns left and right front wheels FW1 and FW2, which serve as turnable wheels, in accordance with steering operation of the driver. The steering operation apparatus 10 includes a steering wheel 11, which serves as an operating portion rotated by the driver. The steering wheel 11 is fixed to an upper end of a steering input shaft 12, and a steering reaction application electric motor (electrical actuator) 13 is assembled to a lower end of the steering input shaft 12. The steering reaction application electric motor 13 rotates the steering input shaft 12 about its axis via a reduction mechanism 14.

The turning apparatus 20 includes a rack bar 21 which extends in the lateral direction of the vehicle. Opposite end portions of this rack bar 21 are connected to the left and right front wheels FW1 and FW2 via unillustrated tie rods and knuckle arms such that those wheels can be turned. When the rack bar 21 displaces axially, the left and right front wheels FW1 and FW2 are turned leftward or rightward. A turning electric motor (electrical actuator) 22 is assembled to an unillustrated housing so that it surrounds the rack bar 21. Rotation of the turning electric motor 22 is reduced by a screw feed mechanism 23, and the reduced rotation is converted to axial displacement of the rack bar 21. Further, the turning apparatus 20 includes a turning output shaft 24 which can rotates about its axis. A pinion gear 25 is fixed to a lower end of the turning output shaft 24, and is in meshing-engagement with rack teeth 21a provided on the rack bar 21. When the turning output shaft 24 rotates about its axis, the rack bar 21 displaces axially.

Further, an electromagnetic clutch 31, which serves as a connecting-disconnecting device, is disposed between the steering input shaft 12 of the steering operation apparatus 10 and the turning output shaft 24 of the turning apparatus 20. When electricity is supplied to the electromagnetic clutch 31, it is brought into a disconnected state so as to prohibit transmission of power between the steering input shaft 12 and the turning output shaft 24. When supply of electricity to the electromagnetic clutch 31 is stopped, it is brought into a connected state so as to permit transmission of power between the steering input shaft 12 and the turning output shaft 24.

Next, an electric controller 40 for controlling operations of the steering reaction application electric motor 13, the turning electric motor 22, and the electromagnetic clutch 31 will be described. The electric controller 40 includes a steering angle sensor 41, a steering torque sensor 42, a turning angle sensor 43, and a vehicle speed sensor 44.

The steering angle sensor 41, which is mounted on the steering input shaft 12, detects rotation angle of the steering input shaft 12 (i.e., the steering wheel 11) from its neutral position, and outputs the sensed angle as steering angle θ (displacement amount). The steering torque sensor 42, which is also mounted on the steering input shaft 12, detects torque which the driver inputs to the steering wheel 11, and outputs the input torque as steering torque T (operation force). The turning angle sensor 43, which is assembled to the rack bar 21, detects axial displacement of the rack bar 21 and outputs the detected displacement as actual turning angle δ (actual turning amount) of the left and right front wheels FW1 and FW2. The vehicle speed sensor 44 detects vehicle speed V and outputs the detected speed.

Notably, the above-described neutral position refers to respective positions of the steering wheel 11, the steering input shaft 12, the turning output shaft 24, and the left and right front wheels FW1 and FW2, at which the vehicle is maintained in a straight travel state. Each of the steering angle θ and the actual turning angle δ becomes "0" at the neutral position, represents a rotation angle in the right direction by a positive value, and represents a rotation angle in the left direction by a negative value. Further, the steering torque T represents torque applied in the right direction by a positive value, and represents torque applied in the left direction by a negative value.

Further, the electric controller 40 includes a checking electronic control unit (hereinafter referred to as the checking ECU) 45, a steering-reaction controlling electronic control unit (hereinafter referred to as the steering reaction control ECU) 46, and a turning controlling electronic control unit (hereinafter referred to as the turning control ECU) 47, which are connected to one another. The steering angle sensor 41 and the steering torque sensor 42 are connected to the checking ECU 45. The steering angle sensor 41, the steering torque sensor 42, and the vehicle speed sensor 44 are connected to the steering reaction control ECU 46. The steering angle sensor 41, the turning angle sensor 43, and the vehicle speed sensor 44 are connected to the turning control ECU 47.

Each of the ECUs 45 to 47 is mainly composed of a microcomputer including a CPU, ROM, RAM, and the like. The checking ECU 45 switches the electromagnetic clutch 31 to a connected state or a disconnected state via a drive circuit 51, and performs a checking program shown in FIG. 2 so as to detect anomaly of the electromagnetic clutch 31. The steering reaction control ECU 46 performs a steering reaction control program shown in FIG. 4 to thereby drive and control the steering reaction application electric motor 13 via a drive circuit 52. The turning control ECU 47 performs a turning control program shown in FIG. 5 to thereby drive and control the turning electric motor 22 via a drive circuit 53.

Next, operation of the first embodiment having the above-described configuration will be described. When an ignition switch is turned on by the driver, the checking ECU 45 executes the checking program only once. More specifically, after the ignition switch is turned on, the checking program is executed only once while the driver first rotates the steering wheel 11. Further, when the ignition switch is turned on, the steering reaction control ECU 46 and the turning control ECU 47 start to repeatedly execute the steering reaction control program and the turning control program at predetermined short intervals.

Figure 2:
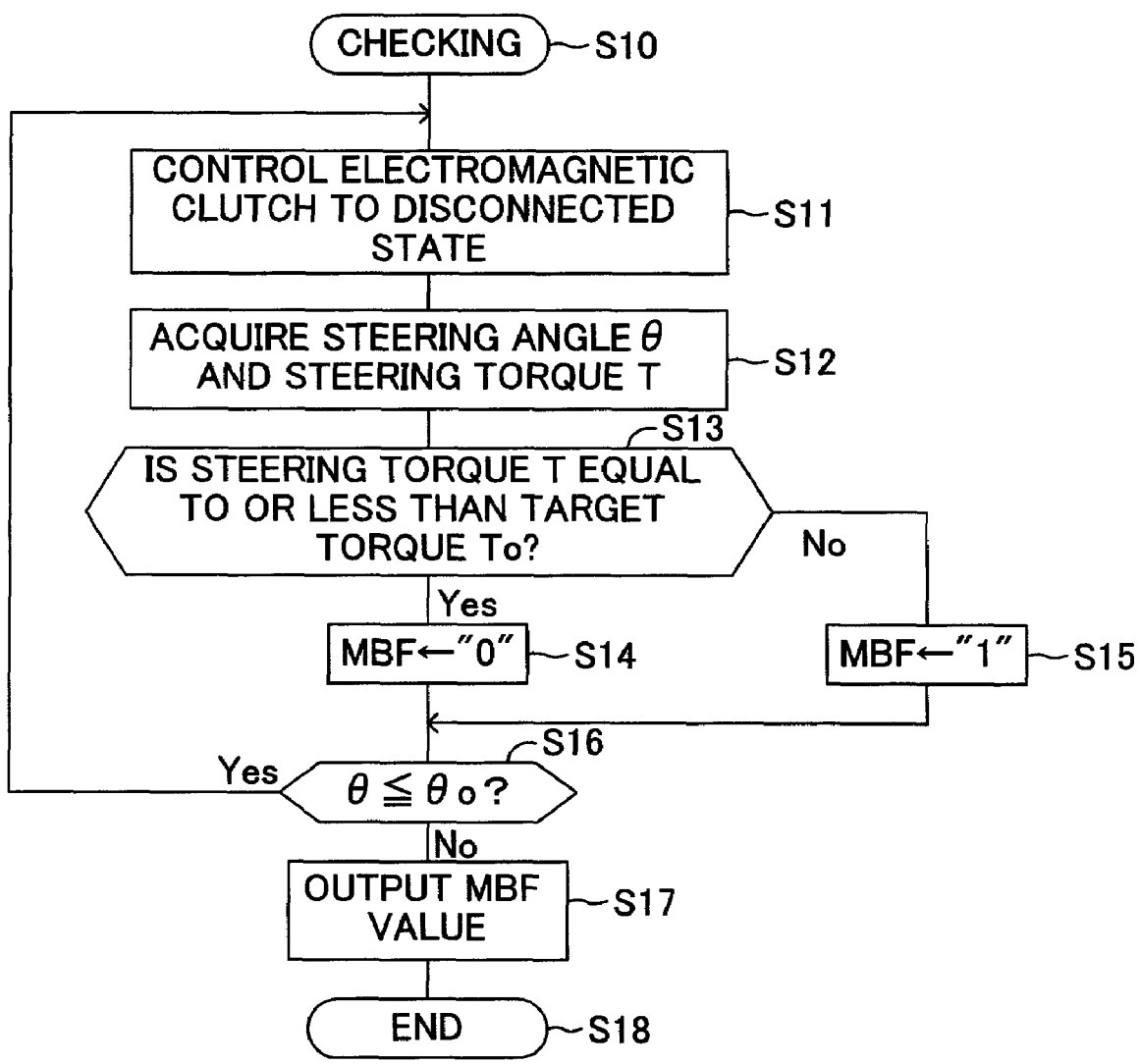
FIG. 2 is a flowchart of a checking program executed by a checking ECU of FIG. 1.

The execution of the checking program is started in step S10 of FIG. 2 after the execution of unillustrated initialization processing. In step S11, the checking ECU 45 supplies electricity to the electromagnetic clutch 31 in cooperation with the drive circuit 51, to thereby bring the electromagnetic clutch 31 into a disconnected state. While the checking program is executed, the turning electric motor 22 is maintained in a stopped state, because the turning control ECU 47 does not control the operation of the turning electric motor 22 until it obtains the value of an anomalous flag MBF, as described below.

After completion of the processing of step S11, the checking ECU 45 acquires in step S12 the steering angle θ and the steering torque T detected by the steering angle sensor 41 and the steering torque sensor 42, respectively, and then proceeds to step S13. In step S13, the checking ECU 45 determines whether the electromagnetic clutch 31 is in a normally disconnected state, on the basis of the magnitude of the acquired steering torque T. This determination will be described below in detail.

First, there will be described a case in which the electromagnetic clutch 31 operates normally. In this case, since the electromagnetic clutch 31 has been brought into a disconnected state through the disconnecting processing of step S11, a driver can readily rotate the steering wheel 11, even though the turning electric motor 22 is in a stopped state. That is, in this state, when the steering wheel 11 is rotated, due to elastic force provided by an unillustrated spring mechanism, frictional force, inertial force, or viscous force, etc., an appropriate torque is generated. The driver senses this torque as reaction force. Therefore, the driver inputs a steering torque T substantially equal to the sensed reaction force to thereby rotate the steering wheel 11.

Figure 3:
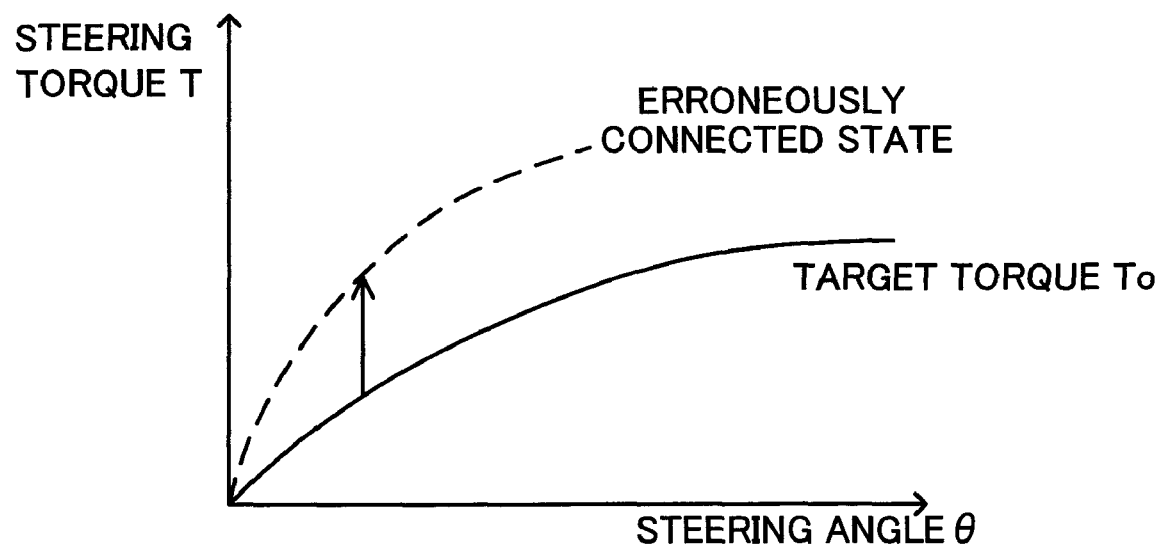
FIG. 3 is a graph showing the relation between steering angle and steering torque and used for explaining change in steering torque when an electromagnetic clutch is normal or anomalous.

Accordingly, when the electromagnetic clutch 31 is in a normally disconnected state, the steering torque sensor 42 detects, as the steering torque T, torque which changes as indicated by a solid line in FIG. 3 (hereinafter, this torque will be referred to as target torque To). If the steering torque T detected by the steering torque sensor 42 is equal to or less than the target torque To, the electromagnetic clutch 31 operates normally. Thus, the checking ECU 45 makes a "Yes" determination in step S13, and proceeds to step S14. In step S14, the checking ECU 45 sets the anomalous flag MBF, which indicates whether the electromagnetic clutch 31 is normal or anomalous, to "0" indicating that the electromagnetic clutch 31 is normal.

Meanwhile, if operation of the electromagnetic clutch 31 becomes anomalous; specifically, if the electromagnetic clutch 31 maintains a connected state even though the disconnecting processing has been performed in step S11, the steering torque T detected by the steering torque sensor 42 exceeds the target torque To. That is, when the electromagnetic clutch 31 maintains a connected state despite the above-described disconnecting control, a state in which the steering input shaft 12 and the turning output shaft 24 are mechanically connected is maintained. Notably, in the following description, a state where the electromagnetic clutch 31 maintains a connected state despite the disconnecting control is referred to as an erroneously connected state.

Incidentally, since the turning electric motor 22 is in the stopped state, the turning output shaft 24 is rotated by power transmitted from the steering input shaft 12; in other words, the steering torque T which the driver inputs via the steering wheel 11. As a result, the steering torque T input by the driver via the steering wheel 11 becomes greater than the target torque To as indicated by a broken line in FIG. 3, because of addition of torque stemming from, for example, torsional stiffness of the steering input shaft 12 or the like. If the steering torque T detected by the steering torque sensor 42 is greater than the target torque To, the electromagnetic clutch 31 is anomalous in operation. Thus, the checking ECU 45 makes a "No" determination in step S13, and proceeds to step S15. In step S15, the checking ECU 45 sets the anomalous flag MBF to "1" indicating that the electromagnetic clutch 31 is anomalous.

After completion of the processing of step S14 or step S15, the checking ECU 45 determines in step S16 whether or not the steering angle θ detected by the steering angle sensor 41 is equal to or less than a previously set, predetermined small steering angle θo. As described above, this checking program is executed while the driver first rotates the steering wheel 11 after the ignition switch is turned on. Further, this checking program is executed when the turning electric motor 22 is in a stopped state. In other words, during the execution of this checking program, the left and right front wheels FW1 and FW2 are not turned by the turning electric motor 22 even if the driver rotates the steering wheel 11. Therefore, the rotation amount of the steering wheel 11 (i.e., the steering angle θ) required for checking operation of the electromagnetic clutch 31 must be decreased so as to alleviate unnatural sensation felt by the driver.

Therefore, if the steering angle θ (the amount of rotation of the steering wheel 11 by the driver) is equal to or less than the predetermined steering angle θo, which is set to such a small value that the driver does not feel any unnatural sensation, the checking ECU 45 makes a "Yes" determination, and repeatedly executes the processings of the above-described step S11 to step S15. Meanwhile, when the steering angle θ is greater than the steering angle θo, the checking ECU 45 makes a "No" determination, and proceeds to step S17. In step S17, the checking ECU 45 outputs the value of the anomalous flag MBF set in step S14 or step S15 to the steering reaction control ECU 46 and the turning control ECU 47, and proceeds to step S18. In step S18, the checking ECU 45 ends the execution of the checking program.

Figure 4:
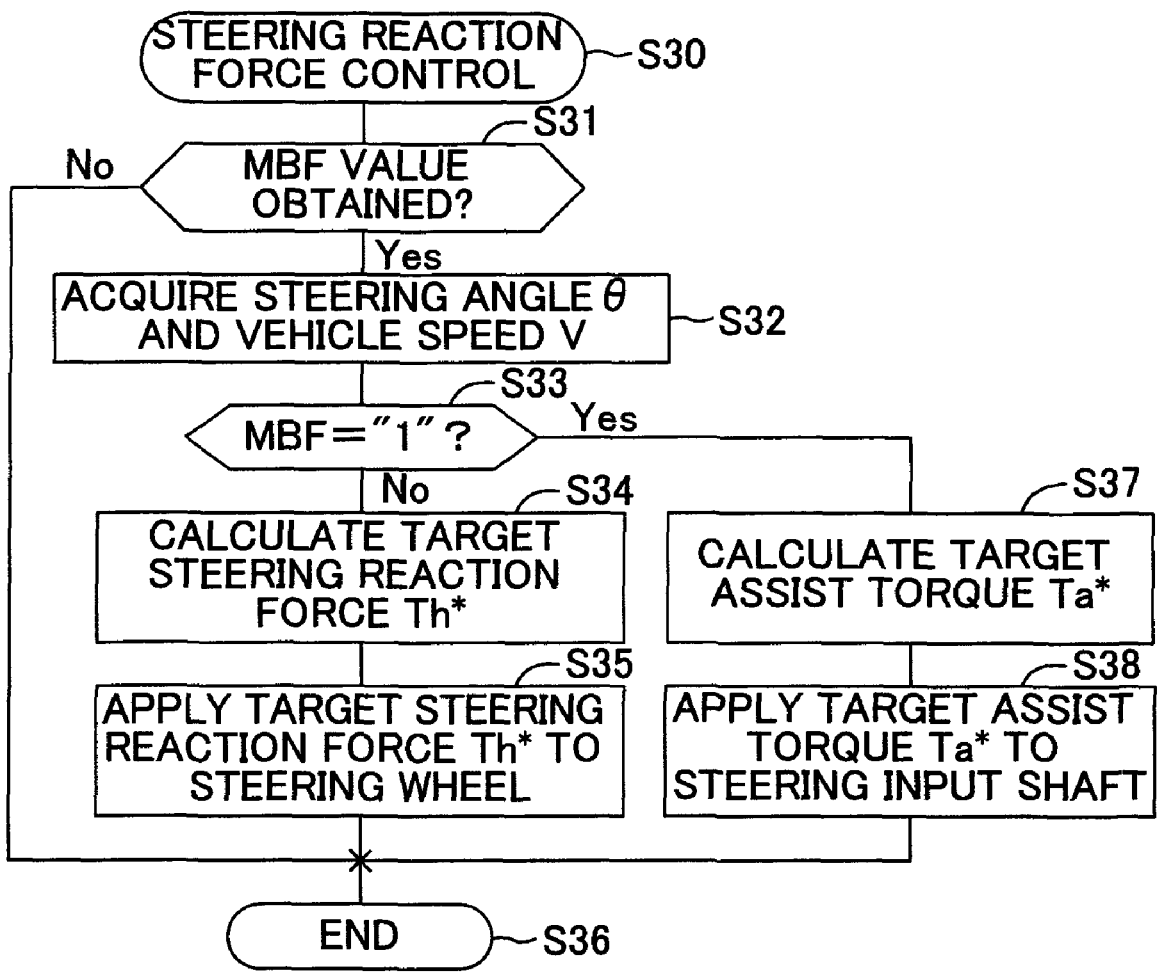
FIG. 4 is a flowchart of a steering reaction control program executed by a steering reaction control ECU of FIG. 1.

Further, after the ignition switch is turned on, the steering reaction control ECU 46 repeatedly executes the steering reaction control program shown in FIG. 4 at predetermined short intervals. When the execution of the steering reaction control program is started in step S30, the steering reaction control ECU 46 determines in step S31 whether it has acquired the value of the anomalous flag MBF from the checking ECU 45. If the steering reaction control ECU 46 has not yet acquired the value of the anomalous flag MBF after the ignition switch had been turned on, the steering reaction control ECU 46 makes a "No" determination in step S31, and in step S36 ends the current execution of the steering reaction control program. In this state, the steering reaction control ECU 46 does not execute substantial processing, but waits for the value of the anomalous flag MBF output from the checking ECU 45.

Meanwhile, upon acquisition of the value of the anomalous flag MBF from the checking ECU 45, the steering reaction control ECU 46 makes a "Yes" determination in step S31, and then starts the execution of the processings of step S32 and subsequent steps. In step S32, the steering reaction control ECU 46 acquires steering angle θ from the steering angle sensor 41 and acquires the vehicle speed V from the vehicle speed sensor 44, and proceeds to step S33.

In step S33, the steering reaction control ECU 46 determines whether or not the value of the anomalous flag MBF acquired from the checking ECU 45 is "1" indicating that the electromagnetic clutch 31 is anomalous. That is, if the value of the anomalous flag MBF is "0" the electromagnetic clutch 31 operates normally. In that case, the steering reaction control ECU 46 makes a "No" determination. The steering reaction control ECU 46 then executes the processings of step S34 and step S35 so as to drive and control the steering reaction application electric motor 13 so that a proper reaction force is applied against the rotation of the steering wheel 11 by the driver (hereinafter, this drive control will be referred to as ordinary reaction control). This ordinary reaction control will be described in detail below.

Figure 6:
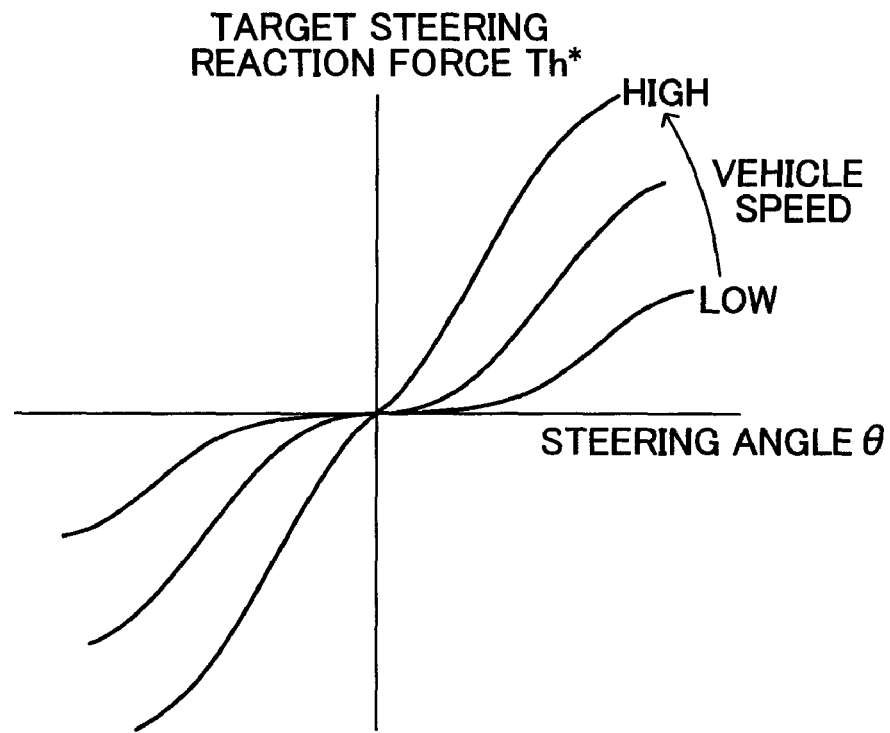
FIG. 6 is a graph showing the relation between steering angle and target steering reaction.

In step S34, the steering reaction control ECU 46 refers to a steering reaction table stored in the ROM, and calculates target steering reaction force Th*, which changes in accordance with the steering angle θ and the vehicle speed V. As shown in FIG. 6, this steering reaction table stores a plurality of target steering reaction forces Th* for a plurality of representative vehicle speeds, each reaction increasing nonlinearly with the steering angle θ. In place of using this steering reaction table, it is possible to previously define a function which represents target steering reaction force Th* that changes in accordance with the steering angle θ and the vehicle speed V, and calculate the target steering reaction force Th* by use of the function.

Next, in step S35, the steering reaction control ECU 46 supplies to the steering reaction application electric motor 13 a drive current which corresponds to the calculated target steering reaction force Th* in cooperation with the drive circuit 52. Subsequently, in step S36, the steering reaction control ECU 46 ends the current execution of this steering reaction control program. With this operation, the steering reaction application electric motor 13 drives the steering input shaft 12 with a rotational torque corresponding to the target steering reaction force Th*. As a result, the target steering reaction force Th* produced by the steering reaction application electric motor 13 is applied against rotation of the steering wheel 11, whereby the driver can rotate the steering wheel 11 while sensing an appropriate steering reaction.

Meanwhile, if the value of the anomalous flag MBF acquired from the checking ECU 45 is "1" the electromagnetic clutch 31 is anomalous. In that case, the steering reaction control ECU 46 makes a "Yes" determination in step S33. Subsequently, the steering reaction control ECU 46 executes steps S37 and S38 so as to drive and control the steering reaction application electric motor 13 so that the rotation of the steering wheel 11 by the driver is assisted in a state where the turning electric motor 22 is stopped through execution of the turning control program, which will be described later (hereinafter, this drive control is referred to as assist control). This assist control will be described in detail below.

Figure 7:
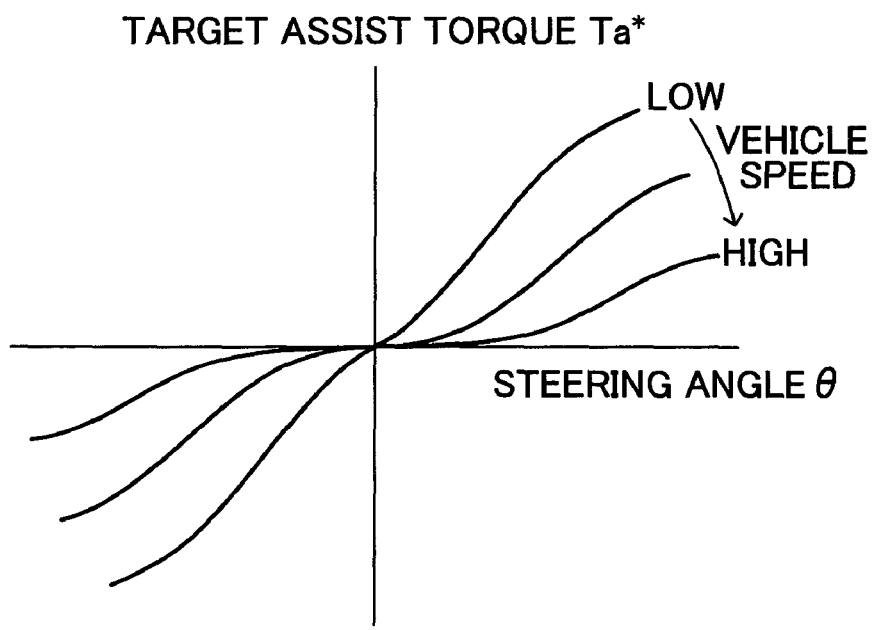
FIG. 7 is a graph showing the relation between steering angle and target assist torque.

In step S37, the steering reaction control ECU 46 refers to an assist command value table stored in the ROM, and calculates a target assist torque Ta* which changes in accordance with the steering angle θ and the vehicle speed V. As shown in FIG. 7, this assist command value table stores a plurality of target assist torques Ta* for a plurality of representative vehicle speeds, each torque increasing nonlinearly with the steering angle θ. In place of using this assist command value table, it is possible to previously define a function which represents target assist torque Ta* changing in accordance with the steering angle θ and the vehicle speed V, and calculate the target assist torque Ta* by use of this function.

Next, in step S38, the steering reaction control ECU 46 supplies to the steering reaction application electric motor 13 a drive current which corresponds to the calculated target assist torque Ta* in cooperation with the drive circuit 52. Subsequently, in step S36, the steering reaction control ECU 46 ends the current execution of this steering reaction control program. With this operation, the steering reaction application electric motor 13 drives the steering input shaft 12 with a rotational torque corresponding to the target assist torque Ta*. As a result, in the state where the turning electric motor 22 is stopped, the turning of the left and right front wheels FW1 and FW2 through rotation of the steering wheel 11 is assisted by the target assist torque Ta*, whereby the driver can rotate the steering wheel 11 lightly.

Figure 5:
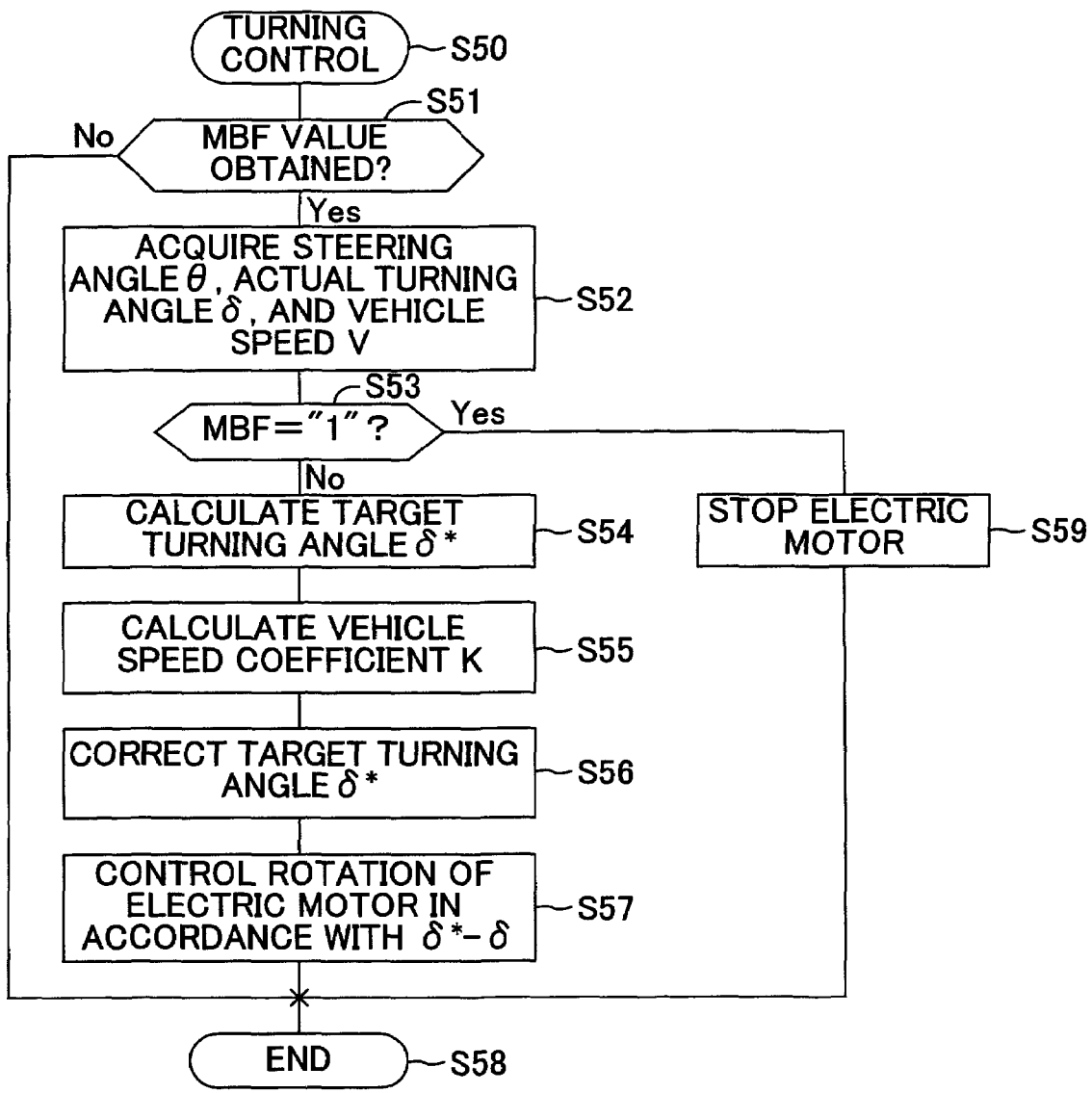
FIG. 5 is a flowchart of a turning control program executed by a turning control ECU of FIG. 1.

Further, after the ignition switch is turned on, the turning control ECU 47 repeatedly executes the turning control program shown in FIG. 5 at predetermined short intervals. The turning control ECU 47 starts execution of the turning control program in step S50 and determines in step S51 whether or not the value of the anomalous flag MBF has been acquired from the checking ECU 45. If the turning control ECU 47 has not yet acquired the value of the anomalous flag MBF after the ignition switch had been turned on, the turning control ECU 47 makes a "No" determination in step S51, and ends the current execution of the turning control program in step S58. In this state, the turning control ECU 47 does not execute substantial processing, but waits for the value of the anomalous flag MBF output from the checking ECU 45.

Meanwhile, if the turning control ECU 47 has acquired the value of the anomalous flag MBF from the checking ECU 45, the turning control ECU 47 makes a "Yes" determination in step S51, and starts to execute the processings of step S52 and subsequent steps. In step S52, the turning control ECU 47 acquires the steering angle $\theta$ from the steering angle sensor 41, the actual turning angle $\delta$ from the turning angle sensor 43, and the vehicle speed V from the vehicle speed sensor 44, and then proceeds to step S53.

In step S53, the turning control ECU 47 determines whether or not the value of the anomalous flag MBF obtained from the checking ECU 45 is "1" indicating that the electromagnetic clutch 31 is anomalous. That is, if the value of the anomalous flag MBF is "0" the electromagnetic clutch 31 operates normally. Therefore, the turning control ECU 47 makes a "No" determination. Subsequently, the turning control ECU 47 executes step S54 to step S57 so as to drive and control the turning electric motor 22 so that the left and right front wheels FW1 and FW2 are turned properly in accordance with the rotation of the steering wheel 11 by the driver (hereinafter, this drive control is referred to as ordinary turning control). This ordinary turning control will be described in detail below.

Figure 8:
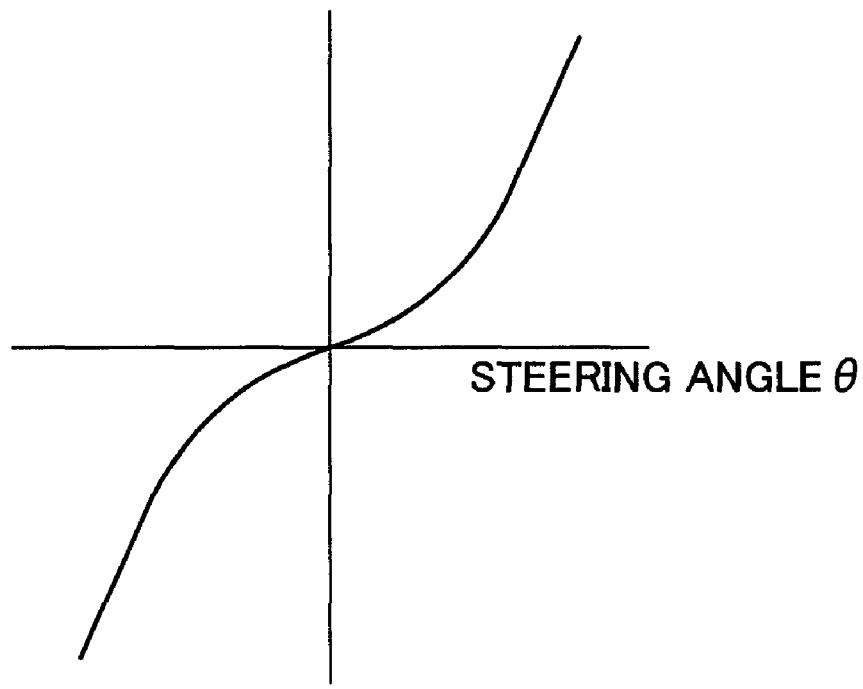
FIG. 8 is a graph showing the relation between steering angle and target turning angle.

In step S54, the turning control ECU 47 refers to an turning angle table stored in the ROM, and calculates a target turning angle $\delta^*$ which changes in accordance with the steering angle $\theta$. As shown in FIG. 8, this turning angle table stores a target turning angle $\delta^*$ which increases nonlinearly with the steering angle $\theta$. The rate of change of the target turning angle $\delta^*$ with respect to the steering angle $\theta$ is set so that the rate is small within a range where the absolute value $|\theta|$ of the turning angle $\theta$ is small and increases as the absolute value $|\theta|$ of the turning angle $\theta$ increases. In place of using this turning angle table, it is possible to previously define a function which represents the relation between the steering angle $\theta$ and the target turning angle $\delta^*$, and calculate the target turning angle $\delta^*$ by use of the function.

Figure 9:
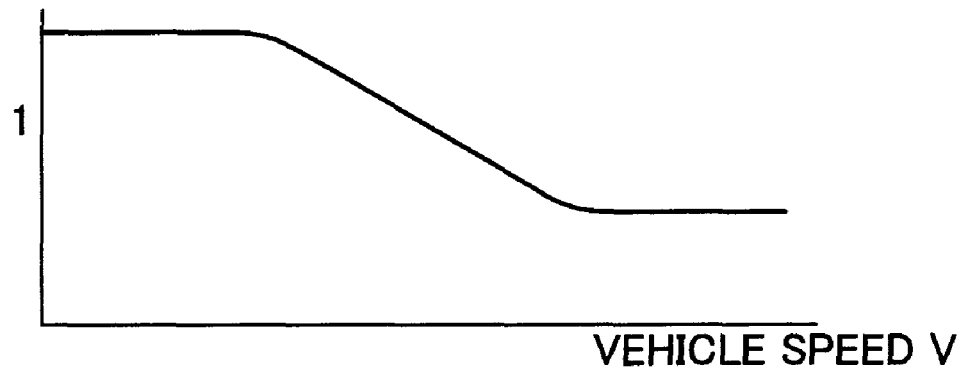
FIG. 9 is a graph showing the relation between vehicle speed and vehicle speed coefficient.

Subsequently, in step S55, the turning control ECU 47 refers to a vehicle speed coefficient table stored in the ROM, and calculates a vehicle speed coefficient K which changes in accordance with the vehicle speed V. This vehicle speed coefficient table stores the vehicle speed coefficient K, which is greater than "1" within a range where the vehicle speed V is low, is less than "1" within a range where the vehicle speed V is high, and decreases nonlinearly so as to pass through "1" as the vehicle speed V increases, as shown in FIG. 9. In place of using this vehicle speed coefficient table, it is possible to previously define a function which represents the relation between the vehicle speed V and the vehicle speed coefficient K, and calculate the vehicle speed coefficient K by use of the function.

After determination of the target turning angle $\delta^*$ and the vehicle speed coefficient K, the turning control ECU 47 performs in step S56 the calculation of a following Eq. 1 so as to correct the target turning angle $\delta^*$ with the vehicle speed coefficient K, to thereby determine a final target turning angle $\delta^*$.

$$\delta^* = K \cdot \delta^* \qquad \text{Eq. 1}$$

In step S57, the turning control ECU 47 controls rotation of the turning electric motor 22 via the drive circuit 53 and by making use of the difference $\delta^* - \delta$ between the target turning angle $\delta^*$ and the actual turning angle $\delta$ so that the actual turning angle $\delta$ finally becomes equal to the target turning angle $\delta^*$. With this operation, the turning electric motor 22 is driven so as to drive the rack bar 21 in the axial direction via the screw feed mechanism 23, to thereby turn the left and right front wheels FW1 and FW2 to the target turning angle $\delta^*$.

With this turning control, as shown in FIG. 8, the left and right front wheels FW1 and FW2 are turned by a small amount in relation to a change in the steering angle $\theta$ within a range where the steering angle $\theta$ is small, and are turned by a large amount in relation to a change in the steering angle $\theta$ within a range where the steering angle $\theta$ is large. As a result, the left and right front wheels FW1 and FW2 can be turned to a large turning angle without requiring the driver to change his grip on the steering wheel 11. Further, as shown in FIG. 9, the left and right front wheels FW1 and FW2 are turned by a large amount in relation to the steering angle $\theta$ when the vehicle speed V is small, and are turned by a small amount in relation to the steering angle $\theta$ when the vehicle speed V increases. After completion of the processing of step S57, the turning control ECU 47 ends the current execution of the turning control program in step S58.

Meanwhile, if the value of the anomalous flag MBF acquired from the checking ECU 45 is "1" the turning control ECU 47 makes a "Yes" determination in step S53, and in step S59 stops the operation of the turning electric motor 22. This control will be described in detail.

If the value of the anomalous flag MBF output from the checking ECU 45 is "1" the electromagnetic clutch 31 is in an erroneously connected state. If the turning electric motor 22 is driven when the electromagnetic clutch 31 is in such an erroneously connected state, the rotational drive force of the electric motor 22 is transmitted to the steering wheel 11 via the rack bar 21, the pinion gear 25, the turning output shaft 24, the electromagnetic clutch 31, and the steering input shaft 12.

In the ordinary turning control which is performed when operation of the electromagnetic clutch 31 is normal, as described above, the target turning angle $\delta^*$ is calculated to increase nonlinearly when the absolute value $|\theta|$ of the steering angle $\theta$ of the steering wheel 11 increases to a certain value, and the turning electric motor 22 is driven and controlled so that the actual turning angle $\delta$ of the left and right front wheels FW1 and FW2 becomes equal to the target turning angle $\delta^*$. Therefore, if the turning electric motor 22 undergoes the ordinary turning control in an erroneously connected state, the steering wheel 11 is, contrary to the driver's intention, automatically rotated by an amount corresponding to the difference between the steering angle $\theta$ input by the driver via steering wheel 11 and the calculated target turning angle $\delta^*$, whereby so-called self steer occurs.

If self steer has occurred, the steering angle $\theta$ increases because of the automatic rotation of the steering wheel 11, so that the calculated target turning angle $\delta^*$ also increases. As a result, the difference between the steering angle $\theta$ and the target turning angle $\delta^*$ further increases, so that the steering wheel 11 becomes easier to rotate. Therefore, it becomes difficult for the driver to turn the vehicle in accordance with his intention. As described above, in the state where self steer has occurred, in order to turn the vehicle in a manner that the driver wishes, the driver must apply a greater torque (steering torque T in the opposite direction) in a direction opposite the automatic rotation of the steering wheel 11 so as to stop the automatic rotation of the steering wheel 11 to thereby maintain a proper steering angle θ.

Accordingly, when the turning control ECU 47 acquires the value of the anomalous flag MBF set to "1" from the checking ECU 45, in step S59 the turning control ECU 47 stops the operation of the turning electric motor 22 so as to prevent occurrence of self steer. In a state where the electromagnetic clutch 31 is in an erroneously connected state and the operation of the turning electric motor 22 is stopped, the left and right front wheels FW1 and FW2 are turned so that the actual turning angle δ changes linearly in relation to the amount of rotation of the steering wheel 11 by the driver (i.e., the steering angle θ). In other words, as compared with the case where the electromagnetic clutch 31 operates normally and the turning electric motor 22 undergoes the ordinary turning control, the driver must rotate the steering wheel 11 by a larger amount in order to turn the vehicle.

In the case where operation of the electromagnetic clutch 31 is anomalous, as having been described in relation to step S37 and step S38 of the steering reaction control program, the steering reaction control ECU 46 controls the steering reaction application electric motor 13 in an assist mode. Therefore, even when the rotational amount of the steering wheel 11 for turning the vehicle is increased, the steering wheel 11 can be rotated lightly, whereby the burden on the driver can be reduced.

After the turning control ECU 47 stops the operation of the turning electric motor 22 in step S59, it proceeds to step S58 so as to end the current execution of the turning control program.

As can be understood from the above description, according to the first embodiment, anomaly of the electromagnetic clutch 31 can be inerrably detected. This anomaly detection can be performed while the driver rotates the steering wheel 11. Therefore, it is possible to suppress unnatural sensation which the driver would otherwise feel during rotation of the steering wheel (for example, the driver cannot rotate the steering wheel 11 while the checking ECU 45 detects anomaly of the electromagnetic clutch 31). Further, since anomaly detection is performed while the driver is rotating the steering wheel 11, a separate time for anomaly detection is not required, so that the operation state of the electromagnetic clutch 31 can be checked efficiently.

Further, the operations of the steering reaction application electric motor 13 and the turning electric motor 22 can be switched in accordance with the operation state of the electromagnetic clutch 31. That is, if operation of the electromagnetic clutch 31 is normal, the steering reaction control ECU 46 performs the ordinary reaction control for the steering reaction application electric motor 13 so that a predetermined reaction force is applied against rotation of the steering wheel 11 by the driver. Further, the turning control ECU 47 performs the ordinary turning control for the turning electric motor 22 so that the left and right front wheels FW1 and FW2 are turned to the target turning angle δ*, which changes nonlinearly in relation to the steering angle θ input by the driver. As a result, the driver can properly turn the vehicle without changing his grip on the steering wheel 11.

Meanwhile, if operation of the electromagnetic clutch 31 is anomalous, the steering reaction control ECU 46 performs the assist control for the steering reaction application electric motor 13 so as to assist rotation of the steering wheel 11 by the driver. Further, the turning electric motor 22 is stopped by the turning control ECU 47. This control can reliably prevent the occurrence of self steer. Therefore, even when operation of the electromagnetic clutch 31 becomes anomalous, the driver can turn the vehicle in accordance with his intention.

b. Second Embodiment

In the above-described first embodiment, the checking program for checking the operation state of the electromagnetic clutch 31 is executed only one time when the driver first rotates the steering wheel 11 after turning the ignition switch on. However, alternatively or additionally, the operation state of the electromagnetic clutch 31 may be checked continuously during travel of the vehicle. This second embodiment will be described in detail. The steering reaction control program and the turning control program are the same as those in the above-described first embodiment; therefore, their descriptions will not be repeated. Further, since the structure of the second embodiment is the same as that of the first embodiment shown in FIG. 1, its description will not be repeated.

Figure 10:
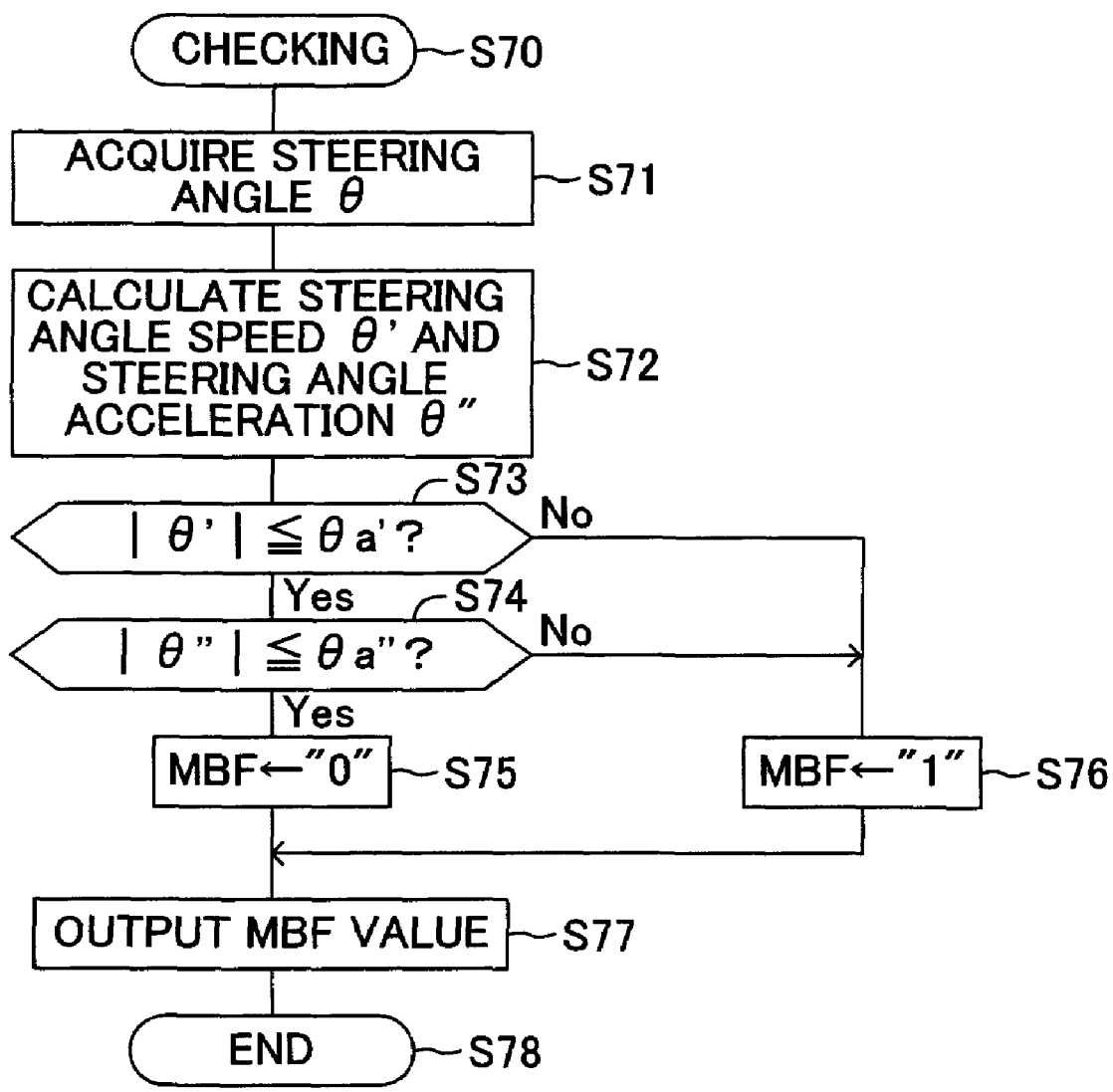
FIG. 10 relates to a second embodiment of the present invention and is a flowchart of a checking program executed by the checking ECU of FIG. 1.

In the second embodiment, after the ignition switch is turned on, the checking ECU 45 starts to repeatedly execute a checking program shown in FIG. 10 at predetermined short intervals. Notably, the second embodiment will be described under the assumption that, after the ignition switch is turned on, the electromagnetic clutch 31 is controlled to a disconnected state so as to enable the steering apparatus to operate in a steering-by-wire mode.

After execution of unillustrated initialization processing, the checking ECU 45 starts the execution of the checking program in step S70; acquires, in step S71, the steering angle θ detected by the steering angle sensor 41; and then proceeds to step S72. In step S72, the checking ECU 45 calculates a time differentiated value dθ/dt of the steering angle θ (hereinafter, this differentiated value will be referred to as steering angle speed θ') and a time differentiated value dθ'/dt of the steering angle speed θ' (hereinafter, this differentiated value will be referred to as steering angle acceleration θ") from the acquired steering angle θ.

After the calculation processing of step S72, the checking ECU 45 executes the processings of step S73 and step S74 so as to determine whether or not the electromagnetic clutch 31 is in an erroneously connected state despite the fact that the electromagnetic clutch 31 is controlled to a disconnected state. Specifically, in step S73, the checking ECU 45 determines whether or not the absolute value |θ'| of the steering angle speed θ' calculated in step S72 is equal to or less than a predetermined steering angle speed θa' experimentally determined in advance. Further, in step S74, the checking ECU 45 determines whether or not the absolute value |θ"| of the steering angle acceleration θ" calculated in step S72 is equal to or less than a predetermined steering angle acceleration θa" experimentally determined in advance. The predetermined steering angle speed θa' and the predetermined steering angle acceleration θa" are determined so that it becomes possible to determine whether or not the steering wheel 11 is rotating due to self steer which has occurred as a result of the electromagnetic clutch 31 having been erroneously connected.

When the checking ECU 45 makes a "Yes" determination in each of step S73 and step S74; i.e., the checking ECU 45 determines that the absolute value |θ'| of the steering angle speed θ' is equal to or less than the predetermined steering angle speed θa' and the absolute value |θ"| of the steering angle acceleration θ" is equal to or less than the predetermined steering angle acceleration θa", the checking ECU 45 determines that no self steer occurs and operation of the electromagnetic clutch 31 is normal. Specifically, when operation of the electromagnetic clutch 31 is normal, since the mechanical connection between the steering input shaft 12 and the turning output shaft 24 is cancelled, the rotational drive force (power) of the turning electric motor 22 is not transmitted to the steering wheel 11 via the steering input shaft 12. Therefore, the absolute value |θ'| of the steering angle speed θ' and the absolute value |θ"| of the steering angle acceleration θ" are attributable to the driver's rotation operation, and become smaller than the predetermined steering angle speed θa' and the predetermined steering angle acceleration θa". Accordingly, in step S75, the checking ECU 45 sets the anomalous flag MBF to "0" indicating that the electromagnetic clutch 31 is normal.

Meanwhile, when the checking ECU 45 makes a "No" determination in step S73; i.e., the checking ECU 45 determines that the absolute value |θ'| of the steering angle speed θ' is greater than the predetermined steering angle speed θa', the checking ECU 45 determines that operation of the electromagnetic clutch 31 is anomalous. Further, when the checking ECU 45 makes a "Yes" determination in step S73 and a "No" determination in step S74; i.e., when the absolute value |θ'| of the steering angle speed θ' is equal to or less than the predetermined steering angle speed θa' and the absolute value |θ"| of the steering angle acceleration θ" is greater than the predetermined steering angle acceleration θa", the checking ECU 45 determines that operation of the electromagnetic clutch 31 is anomalous. This determination will be described in detail with reference to FIG. 11.

FIG. 11 schematically shows changes in the steering angle θ, the steering angle speed θ', and the steering angle acceleration θ" with time. In a state where operation of the electromagnetic clutch 31 is normal and the steering input shaft 12 and the turning output shaft 24 are mechanically disconnected, self steer does not occur. Therefore, the amount of rotation of the steering wheel 11 by the driver; i.e., the steering angle θ, changes with time as shown in FIG. 11(a); that is, it changes within a relatively narrow range in response to the driver's rotating operation. Further, the steering angle speed θ' and the steering angle acceleration θ" at that time also change within relatively narrow ranges as shown in FIGS. 11(b) and 11(c).

However, if operation of the electromagnetic clutch 31 becomes anomalous at a certain time and the electromagnetic clutch 31 enters an erroneously connected state, self steer occurs. When self steer occurs, as shown in FIG. 11(a), the steering angle θ increases continuously. Further, as shown in FIG. 11(b), the steering angle speed θ' increases continuously with the steering angle θ, and exceeds the predetermined steering angle speed θa'. Accordingly, the checking ECU 45 can determine, in step S73, occurrence of self steer; i.e., occurrence of anomaly of the electromagnetic clutch 31 through comparison between the absolute value |θ'| of the steering angle speed θ' and the predetermined steering angle speed θa'.

Incidentally, when self steer occurs, a certain period of time may elapse before the steering angle speed θ' exceeds the predetermined steering angle speed θ', as is apparent from FIG. 11(b). For example, in a case where the turning electric motor 22 generates a large rotational drive force and the steering wheel 11 rotates at a large steering angle speed θ', the steering angle speed θ' quickly exceeds the predetermined steering angle speed θa', and the checking ECU 45 can make a "No" determination in step S73. However, in a case where the steering wheel 11 rotates relatively quickly, even though self steer is occurring, occurrence of such self steer possibly cannot be determined at the time of execution of the processing of step S73.

In contrast, as is apparent from FIG. 11(c), the steering angle acceleration θ" changes in response to occurrence of self steer quicker than does the steering angle speed θ'. Accordingly, through execution of the determination processing of step S74, the checking ECU 45 can reliably determine occurrence of self steer; i.e., anomaly of the electromagnetic clutch 31, within a short period of time. That is, even when the checking ECU 45 makes a "Yes" determination in step S73, the checking ECU 45 can make a "No" determination in step S74. With this operation, occurrence of self steer can be detected reliably, and thus, anomaly of the electromagnetic clutch 31 can be determined inerrably. As described above, through execution of step S73 and step S74, the checking ECU 45 can reliably determine occurrence of anomaly of the electromagnetic clutch 31. When the checking ECU 45 makes a "NO" determination in step S73 or step S74, it proceeds to step S76, and sets the anomaly flag MBF to "1" indicating that the electromagnetic clutch 31 is anomalous.

After the processing of step S75 or step S76, in step S77, the checking ECU 45 outputs the value of the set anomaly flag MBF to the steering-reaction control ECU 46 and the turning control ECU 47. After outputting the value of the anomaly flag MBF, the checking ECU 45 ends the current execution of the checking program in step S78, and again starts the checking program after elapse of a predetermined short time interval. Meanwhile, the steering-reaction control ECU 46 performs the steering reaction control program of FIG. 4 in a manner similar to that in the first embodiment, and the turning control ECU 47 performs the turning control program of FIG. 5 in a manner similar to that in the first embodiment. Accordingly, as in the case of the first embodiment, the steering reaction control and the turning control are properly preformed in accordance with the set value of the anomaly flag MBF.

As can be understood from the above description, according to the second embodiment, anomaly of the electromagnetic clutch 31 can be detected inerrably even when the vehicle is traveling. Further, it is possible to detect anomaly of the electromagnetic clutch 31 on the basis of occurrence of self steer and control the operations of the steering reaction application electric motor 13 and the turning electric motor 22 in a manner similar to that in the first embodiment in order to cope with the anomaly. Accordingly, the influence of self steer on the rotating operation of the steering wheel 11 by the driver can be reduced considerably, and the vehicle can be turned in accordance with the driver's intention.

c. First Modification of Second Embodiment

Next, there will be described in detail a first modification of the above-described second embodiment. This modification can determine occurrence of self steer; i.e., anomaly of the electromagnetic clutch 31, inerrably and quickly on the basis of a change in the input direction of the steering torque T in relation to the input direction of the steering angle θ. In this first modification, after the ignition switch is turned on, the checking ECU 45 starts to repeatedly execute a checking program shown in FIG. 12 at predetermined short intervals. Notably, the first modification will be described under the assumption that, after the ignition switch is turned on, the electromagnetic clutch 31 is controlled to a disconnected state.

After execution of unillustrated initialization processing, the checking ECU 45 starts the execution of the checking program in step S90, and acquires, in step S91, the steering angle θ detected by the steering angle sensor 41 and the steering torque T detected by the steering torque sensor 42.

Upon acquisition of the steering angle θ and the steering torque T, the checking ECU 45 determines in step S92 whether or not the input direction of the detected steering angle θ coincides with that of the steering torque T. This determination will be described in detail with reference to FIG. 13.

As described in the first embodiment, in a state where the electromagnetic clutch 31 operates normally, the steering-reaction control ECU 46 performs the ordinary reaction control for the steering reaction application electric motor 13, and the turning control ECU 47 performs the ordinary turning control for the turning electric motor 22. In such a state, the driver rotates and operates the steering wheel 11 while sensing, via the steering wheel 11, the steering reaction applied through driven of the steering reaction application electric motor 13. That is, the driver inputs to the steering wheel 11 a steering torque T approximately equal to the steering reaction force, to thereby rotate the steering wheel 11 in the input direction of the steering torque T. Accordingly, when the electromagnetic clutch 31 operates normally and the steering reaction application electric motor 13 undergoes the ordinary reaction control performed by the steering-reaction control ECU 46, as shown in FIG. 13, the input direction of the steering angle θ and the input direction of the steering torque T coincide with each other. Meanwhile, in a state where the electromagnetic clutch 31 operates normally, the left and right front wheels FW1 and FW2 are turned to the target turning angle δ* by the turning electric motor 22 undergoing the normal turning control.

Meanwhile, when operation of the electromagnetic clutch 31 becomes anomalous; more specifically, when the electromagnetic clutch 31 enters an erroneously connected state, the input direction of the steering angle θ and the input direction of the steering torque T do not coincide with each other. For specific description, there will be considered a case were the steering-reaction control ECU 46 performs the ordinary reaction control, the turning control ECU 47 performs the ordinary turning control, and the vehicle is turning. If the electromagnetic clutch 31 enters an erroneously connected state in such a state, as described above, self steer occurs, and the steering wheel 11 automatically start to rotate. In the state where self steer has occurred, the driver starts to apply a steering torque T in the direction opposite the previous input direction so as to stop the automatic rotation of the steering wheel 11 to thereby maintain the intended turning state of the vehicle. That is, the input direction of the steering angle θ and the input direction of the steering torque T do not coincide with each other, and when the relation between the steering angle θ and the steering torque T is illustrated, the relation falls within areas A shown in FIG. 13.

In view of the forgoing, in step S92, the checking ECU 45 compares the input direction of the steering angle θ and that of the detected steering torque T; more specifically, the sign of the steering angle θ and that of the detected steering torque T. When the signs of the steering angle θ and the steering torque T coincide with each other, no self steer occurs; in other words, operation of the electromagnetic clutch 31 is normal. In such a case, the checking ECU 45 makes a "Yes" determination, and proceeds to step S93. In step S93, the checking ECU 45 sets the anomaly flag MBF to "0" indicating that the electromagnetic clutch 31 is normal.

Meanwhile, when the signs of the steering angle θ and the steering torque T do not coincide with each other, self steer occurs; in other words, operation of the electromagnetic clutch 31 is anomalous. In such a case, the checking ECU 45 makes a "No" determination, and proceeds to step S94. In step S94, the checking ECU 45 sets the anomaly flag MBF to "1" indicating that the electromagnetic clutch 31 is anomalous.

After the processing of step S93 or step S94, in step S95, the checking ECU 45 outputs the value of the set anomaly flag MBF to the steering-reaction control ECU 46 and the turning control ECU 47. After outputting the value of the anomaly flag MBF, the checking ECU 45 ends the current execution of the checking program in step S96, and again starts the checking program after elapse of a predetermined short time interval. Meanwhile, the steering-reaction control ECU 46 performs the steering reaction control program of FIG. 4 in a manner similar to that in the first embodiment, and the turning control ECU 47 performs the turning control program of FIG. 5 in a manner similar to that in the first embodiment. Accordingly, as in the case of the first embodiment, the steering reaction control and the turning control are properly preformed in accordance with the set value of the anomaly flag MBF.

As can be understood from the above description, according to the first modification of the second embodiment, occurrence of self steer (i.e., anomaly of the electromagnetic clutch 31) can be determined on the basis of a change in the input direction of the steering torque T in relation to the input direction of the steering angle θ. Therefore, it is possible to detect anomaly of the electromagnetic clutch 31 more quickly and more inerrably as compared with the above-described second embodiment.

That is, in the second embodiment, occurrence of self steer (i.e., anomaly of the electromagnetic clutch 31) is determined through comparison between the steering angle speed θ' and the steering angle acceleration θ", which are determined on the basis of the acquired steering angle θ, and the predetermined steering angle speed θa' and the predetermined steering angle acceleration θa". However, the steering angle speed θ' and the steering angle acceleration θ" at the time when self steer occurs depend on the rotational drive force generated by the turning electric motor 22, and may change depending on battery voltage, road surface conditions, vehicle speed, etc. Further, the predetermined steering angle speed θa' and the predetermined steering angle acceleration θa" must be set appropriately in accordance with the steering angle speed θ' and the steering angle acceleration θ", which change as described above. Moreover, in the case where occurrence of self steer (i.e., anomaly of the electromagnetic clutch 31) is determined by use of changing factors, time delay may possibly occur in the determination processing.

In contrast, in the first modification, occurrence of anomaly of the electromagnetic clutch 31 can be determined on the basis of a change in the input direction of the steering torque T in relation to the input direction of the steering angle θ. Therefore, the above-described external factors which affect the anomaly determination do not exist, and the time delay involved in the determination processing can be reduced. Accordingly, occurrence of anomaly of the electromagnetic clutch 31 can be determined more quickly and more inerrably.

d. Second Modification of Second Embodiment

Next, there will be described a second modification in which occurrence of self steer; i.e., anomaly of the electromagnetic clutch 31, is determined on the basis of the steering angle speed θ' and the time-differentiated value dδ/dt of the actual turning angle δ (hereinafter, this differentiated value will be called turning angle speed δ'). In this second modification, as indicated by a broken line in FIG. 1, a turning angle sensor 43 is connected to the checking ECU 45. In the second modification, after the ignition switch is turned on, the checking ECU 45 starts to repeatedly execute a checking program shown in FIG. 14 at predetermined short intervals. Notably, this second modification will also be described under the assumption that, after the ignition switch is turned on, the electromagnetic clutch 31 is controlled to a disconnected state.

After execution of unillustrated initialization processing, the checking ECU 45 starts the execution of the checking program in step S110, and acquires, in step S111, the steering angle θ detected by the steering angle sensor 41 and the actual turning angle δ detected by the turning angle sensor 43. In step S112 subsequent thereto, the checking ECU 45 calculates the steering angle speed θ' from the acquired steering angle θ, and calculates the turning angle speed δ' from the acquired actual turning angle δ.

After completion of the calculation processing of step S112, the checking ECU 45 determines whether or not self steering (i.e., anomaly of the electromagnetic clutch 31) is occurring by comparing the absolute value |θ'| of the steering angle speed θ' and the absolute value |δ'| of the tuning angle speed δ'. This determination will be described in detail with reference to FIG. 15.

As described in the first embodiment, in a state where the electromagnetic clutch 31 operates normally, the turning control ECU 47 performs the ordinary turning control for the turning electric motor 22. In such a state, the left and right front wheels FW1 and FW2 are turned to a target turning angle δ*, which is calculated to linearly increase in relation to the amount of rotation of the steering wheel 11 by the driver (i.e., steering angle θ). Therefore, as shown in FIG. 15, the tuning angle speed δ' becomes greater than the steering angle speed θ'. However, when the electromagnetic clutch 31 is in an erroneously connected state, the tuning angle speed δ' coincides with the steering angle speed θ', or the tuning angle speed δ' becomes smaller than the steering angle speed θ' because of the speed reduction ratio between the rack bar 21 and the pinion gear 25. When the relation between the steering angle speed θ' and the tuning angle speed δ' is illustrated, the relation falls within an area B shown in FIG. 15.

In view of the forgoing, the checking ECU 45 performs the flowing determination processing in step S113. When the calculated tuning angle speed δ' is greater than the calculated steering angle speed θ', self steer is not occurring; that is, operation of the electromagnetic clutch 31 is not anomalous. Therefore, the checking ECU 45 makes a "Yes" determination, and proceeds to step S114. In step S114, the checking ECU 45 sets the anomaly flag MBF to "0" indicating that the electromagnetic clutch 31 is normal.

Meanwhile, when the calculated tuning angle speed δ' is equal to or less than the calculated steering angle speed θ', self steer is occurring; that is, operation of the electromagnetic clutch 31 is anomalous. In such a case, the checking ECU 45 makes a "No" determination, and proceeds to step S115. In step S115, the checking ECU 45 sets the anomaly flag MBF to "1" indicating that the electromagnetic clutch 31 is anomalous.

After the processing of step S114 or step S115, in step S116, the checking ECU 45 outputs the value of the set anomaly flag MBF to the steering-reaction control ECU 46 and the turning control ECU 47. After outputting the value of the anomaly flag MBF, the checking ECU 45 ends the current execution of the checking program in step S117, and again starts the checking program after elapse of a predetermined short time interval. Meanwhile, the steering-reaction control ECU 46 performs the steering reaction control program of FIG. 4 in a manner similar to that in the first embodiment, and the turning control ECU 47 performs the turning control program of FIG. 5 in a manner similar to that in the first embodiment. Accordingly, as in the case of the first embodiment, the steering reaction control and the turning control are properly preformed in accordance with the set value of the anomaly flag MBF.

As can be understood from the above description, according to the second modification, occurrence of self steer (i.e., anomaly of the electromagnetic clutch 31) can be determined inerrably and quickly without use of the steering torque sensor 42. In a steering-by-wire-type steering apparatus, since the steering input shaft 12 and the turning output shaft 24 are separated, restriction is imposed on the arrangement of the steering torque sensor 42 in some cases. However, according to this second modification, a space for disposing the steering torque sensor 42 is not required, and the degree of freedom of mounting the steering apparatus can be secured sufficiently. In addition to this advantageous effect, advantageous effects similar to those of the above-described first modification are expected.

In the second modification, occurrence of self steer (i.e., anomaly of the electromagnetic clutch 31) is determined through comparison between the absolute value |θ'| of the steering angle speed θ' and the absolute value |δ'| of the tuning angle speed δ'. In this case, the absolute value |θ| of the steering angle θ and the absolute value |δ| of the actual tuning angle δ may be compared. When the steering angle θ detected by the steering angle sensor 41 and the actual turning angle δ detected by the turning angle sensor 43 are employed, the calculation of the steering angle speed θ' and the tuning angle speed δ' can be omitted. Moreover, the absolute value |θ"| of the steering angle acceleration θ" and the absolute value |δ"| of the time-differentiated value dθ'/dt of the turning angle speed δ' (hereinafter, this time-differentiated value will be called tuning angle acceleration δ") may be compared. Through employment of the steering angle acceleration θ" and the tuning angle acceleration δ", occurrence of self steer can be detected quickly. In these cases as well, advantageous effects similar to those of the above-described second modification are expected.

e. Third Modification of Second Embodiment

Next, there will be described a third modification of the above-described second embodiment, in which occurrence of self steer; i.e., anomaly of the electromagnetic clutch 31, is determined on the basis of a change in the magnitude of the steering torque T detected by the steering torque sensor 42.

In the third modification, after the ignition switch is turned on, the checking ECU 45 starts to repeatedly execute a checking program shown in FIG. 16 at predetermined short intervals. Notably, this third modification will also be described under the assumption that, after the ignition switch is turned on, the electromagnetic clutch 31 is controlled to a disconnected state.

After execution of unillustrated initialization processing, the checking ECU 45 starts the execution of the checking program in step S130, and acquires, in step S131, the steering torque T detected by the steering torque sensor 42. In step S132, the checking ECU 45 determines whether or not the magnitude of the acquired steering torque T change abruptly. This determination will be described in detail with reference to FIG. 17.

As described in the first modification of the second embodiment, in a state where the steering-reaction control ECU 46 performs the ordinary reaction control for the steering reaction application electric motor 13, the driver inputs the steering torque T against the applied steering reaction force. However, when steering steer occurs, the steering wheel 11 automatically rotates in the direction in which the driver is rotating the steering wheel 11, so that the driver senses so-called torque drop; i.e., a phenomenon in which the steering torque T decreases sharply. That is, as shown in FIG. 17, when self steer occurs, the changing characteristic of the steering torque T which is indicated by a broken line and which the driver senses during the ordinary reaction control changes such that the steering torque T abruptly drops as indicated by a solid line.

In view of the forgoing, the checking ECU 45 performs the flowing determination processing in step S132. When the acquired steering torque T changes in accordance with the changing characteristic during the ordinary reaction control, self steer is not occurring; in other words, operation of the electromagnetic clutch 31 is not anomalous. Therefore, the checking ECU 45 makes a "Yes" determination, and proceeds to step S133. In step S133, the checking ECU 45 sets the anomaly flag MBF to "0" indicating that the electromagnetic clutch 31 is normal.

Meanwhile, when the acquired steering torque T abruptly changes from the changing characteristic during the ordinary reaction control, self steer is occurring; in other words, operation of the electromagnetic clutch 31 is anomalous. In such a case, the checking ECU 45 makes a "No" determination, and proceeds to step S134. In step S134, the checking ECU 45 sets the anomaly flag MBF to "1" indicating that the electromagnetic clutch 31 is anomalous.

After the processing of step S133 or step S134, in step S135, the checking ECU 45 outputs the value of the set anomaly flag MBF to the steering-reaction control ECU 46 and the turning control ECU 47. After outputting the value of the anomaly flag MBF, the checking ECU 45 ends the current execution of the checking program in step S136, and again starts the checking program after elapse of a predetermined short time interval. Meanwhile, the steering-reaction control ECU 46 performs the steering reaction control program of FIG. 4 in a manner similar to that in the first embodiment, and the turning control ECU 47 performs the turning control program of FIG. 5 in a manner similar to that in the first embodiment. Accordingly, as in the case of the first embodiment, the steering reaction control and the turning control are properly preformed in accordance with the set value of the anomaly flag MBF.

As can be understood from the above description, according to the third modification, occurrence of anomaly of the electromagnetic clutch 31 can be determined on the basis of a change in the magnitude of the steering torque T. Therefore, in this third modification as well, the external factors involved in the second embodiment and affecting the anomaly determination do not exist, and the time delay involved in the determination processing can be reduced. Accordingly, occurrence of anomaly of the electromagnetic clutch 31 can be determined more quickly and more inerrably.

f. Fourth Modification of Second Embodiment

Next, there will be described a fourth modification, in which occurrence of self steer; i.e., anomaly of the electromagnetic clutch 31, is determined on the basis of a change in the difference between the target turning angle δ* and the actual turning angle δ.

In the fourth modification, after the ignition switch is turned on, the checking ECU 45 starts to repeatedly execute a checking program shown in FIG. 18 at predetermined short intervals. Notably, this fourth modification will also be described under the assumption that, after the ignition switch is turned on, the electromagnetic clutch 31 is controlled to a disconnected state.

After execution of unillustrated initialization processing, the checking ECU 45 starts the execution of the checking program in step S150, and acquires, in step S151, the actual turning angle δ detected by the turning angle sensor 43. In step S152, the checking ECU 45 determines whether or not the difference between the acquired actual turning angle δ and the target turning angle δ* calculated by the turning control ECU 47 changes at a constant rate. This determination will be described in detail with reference to FIG. 19.

As described in the first embodiment, in a state where the electromagnetic clutch 31 operates normally, the turning control ECU 47 calculates the target turning angle δ*, which changes nonlinearly, through execution of the processings of steps S54 to S56 of the turning control program. In step S57 of the turning control program, the turning control ECU 47 then controls the rotation of the turning electric motor 22 so that the detected actual turning angle δ becomes equal to the target turning angle δ*. In such a state, when the electromagnetic clutch 31 is erroneously connected, the steering input shaft 12 and the turning output shaft 24 are mechanically connected as described above. As result, by means of rotating operation of the steering wheel 11 by the driver, the left and right front wheels FW1 and FW2 are turned so that the actual turning angle δ changes linearly with respect to the steering angle θ. Here, there will be considered the difference between the actual turning angle δ (target turning angle δ*) during the ordinary turning control and the actual turning angle δ at the time when self steering is occurring (i.e., when the electromagnetic clutch 31 is in an erroneously connected state). As shown in FIG. 19, the difference increases at a constant rate as the steering angle θ increases.

In view of the forgoing, the checking ECU 45 performs the flowing determination processing in step S152. When the difference between the calculated target turning angle δ* and the acquired actual turning angle δ does not increase at a constant rate; i.e., when the target turning angle δ* and the actual turning angle δ change in such a manner that they generally coincide with each other, self steer is not occurring; in other words, operation of the electromagnetic clutch 31 is not anomalous. Therefore, the checking ECU 45 makes a "Yes" determination, and proceeds to step S153. In step S153, the checking ECU 45 sets the anomaly flag MBF to "0" indicating that the electromagnetic clutch 31 is normal.

Meanwhile, when the difference between the calculated target turning angle δ* and the acquired actual turning angle δ increases at a constant rate, self steer is occurring; in other words, operation of the electromagnetic clutch 31 is anomalous. In such a case, the checking ECU 45 makes a "No" determination, and proceeds to step S154. In step S154, the checking ECU 45 sets the anomaly flag MBF to "1" indicating that the electromagnetic clutch 31 is anomalous.

After the processing of step S153 or step S154, in step S155, the checking ECU 45 outputs the value of the set anomaly flag MBF to the steering-reaction control ECU 46 and the turning control ECU 47. After outputting the value of the anomaly flag MBF, the checking ECU 45 ends the current execution of the checking program in step S156, and again starts the checking program after elapse of a predetermined short time interval. Meanwhile, the steering-reaction control ECU 46 performs the steering reaction control program of FIG. 4 in a manner similar to that in the first embodiment, and the turning control ECU 47 performs the turning control program of FIG. 5 in a manner similar to that in the first embodiment. Accordingly, as in the case of the first embodiment, the steering reaction control and the turning control are properly preformed in accordance with the set value of the anomaly flag MBF.

As can be understood from the above description, according to the fourth modification, occurrence of anomaly of the electromagnetic clutch 31 can be determined on the basis of the change rate of the difference between the target turning angle δ* and the actual turning angle δ. Therefore, in this fourth modification as well, the external factors involved in the second embodiment and affecting the anomaly determination do not exist, and the time delay involved in the determination processing can be reduced. Accordingly, occurrence of anomaly of the electromagnetic clutch 31 can be determined more quickly and more reliably.

Moreover, in this fourth modification as well, occurrence of self steer (i.e., anomaly of the electromagnetic clutch 31) can be determined inerrably and quickly without use of the steering torque sensor 42. In a steering-by-wire-type steering apparatus, since the steering input shaft 12 and the turning output shaft 24 are separated, restriction is imposed on the arrangement of the steering torque sensor 42 in some cases. However, according to this fourth modification, a space for disposing the steering torque sensor 42 is not required to secure, and the degree of freedom of mounting the steering apparatus can be secured sufficiently. In addition to this advantageous effect, advantageous effects similar to those of the above-described first modification are expected.

g. Other Modifications

In the first embodiment, the second embodiment, and the modifications thereof, the checking ECU 45 detects an erroneously connected state of the electromagnetic clutch 31 so as to operate the steering apparatus for a vehicle in a steering-by-wire mode. However, in the steering-by-wire-type steering apparatus, if necessary, the steering apparatus may be operated with the steering input shaft 12 and the steering output shaft 24 being connected. In such a case, the electromagnetic clutch 31 must enter a connected state without fail, and the checking ECU 45 must determine whether or not the electromagnetic clutch 31 maintains a disconnected state despite the fact that the electromagnetic clutch 31 is controlled to a connected state (hereinafter, this state will be referred to an erroneously disconnected state). Even in the case where the checking ECU 45 determines an erroneously disconnected state of the electromagnetic clutch 31, such determination can be performed easily and inerrably through execution of the above-described checking programs. This will be described specifically below.

First, there will be described a case where an erroneously disconnected state of the electromagnetic clutch 31 is determined during an initial rotating operation by the driver by use of the checking program of the first embodiment. In this case, instead of performing step S12 of the checking program of FIG. 2, the checking ECU 45 controls the electromagnetic clutch 31 to a connected state. Subsequently, instead of performing step S14, the checking ECU 45 determines whether or not the steering torque T is greater than the target torque To. With this determination, the checking ECU 45 can determine whether or not the electromagnetic clutch 31 is in an erroneously disconnected state. That is, when the steering torque T is determined to be greater than the target torque To, the electromagnetic clutch 31 operates normally. Therefore, the checking ECU 45 sets the anomaly flag MBF to "0". Meanwhile, when the steering torque T is determined to be equal to or less than the target torque To, the electromagnetic clutch 31 maintains an erroneously disconnected state. Therefore, the checking ECU 45 sets the anomaly flag MBF to "1". As described above, even when an erroneously disconnected state of the electromagnetic clutch 31 is determined, such determination can be performed easily and inerrably.

Second, there will be described a case where an erroneously disconnected state of the electromagnetic clutch 31 is determined during travel by use of the checking programs of the second embodiment and the modifications thereof. In this case, the checking ECU 45 determines an erroneously disconnected state of the electromagnetic clutch 31 by positively generating slight self steer. That is, the checking ECU 45 determines that the electromagnetic clutch 31 is normal when occurrence of self steer is recognized in the determining processing of steps S73 and 74 of the checking program of the second embodiment, step S92 of the checking program of the first modification, step S113 of the checking program of the second modification, step S132 of the checking program of the third modification, and step S152 of the checking program of the fourth modification. The checking ECU 45 then sets the anomaly flag MBF to "0". Meanwhile, when occurrence of self steer is not recognized, the checking ECU 45 determines that the electromagnetic clutch 31 maintains an erroneously disconnected state, and sets the anomaly flag MBF to "1". In this case as well, an erroneously disconnected state of the electromagnetic clutch 31 can be determined easily and inerrably.

Notably, in the case where an erroneously disconnected state of the electromagnetic clutch 31 is determined; in other words, the case where the states of the electromagnetic clutch 31 which are determined to be normal and anomalous in the above-described embodiments and modifications are reversed, the steering-reaction control ECU 46 controls the steering reaction application electric motor 13 in the revere direction, and the turning control ECU 47 control the turning electric motor 22 in the reverse direction. That is, in the case where the checking ECU 45 determines an erroneously disconnected state of the electromagnetic clutch 31, if the anomaly flag MBF is set to "0", the steering-reaction control ECU 46 performs assist control for the steering reaction application electric motor 13 by performing the steering reaction control program, and the turning control ECU 47 stops the turning electric motor 22 by performing the turning control program. Meanwhile, if the anomaly flag MBF is set to "1", the steering-reaction control ECU 46 performs ordinary reaction control for the steering reaction application electric motor 13 by performing the steering reaction control program, and the turning control ECU 47 performs ordinary turning control for the turning electric motor 22 by performing the turning control program.

In the above-described embodiments and modifications, as shown in FIG. 1, the electromagnetic clutch 31 directly connects the steering input shaft 12 and the turning output shaft 24. However, as shown in FIG. 20, a cable 32, serving as an intermediate member, may be disposed between the steering input shaft 12 and the turning output shaft 24 so as to facilitate mounting of the steering apparatus onto the vehicle.

In such a configuration, the cable 32 transmits rotation of the steering input shaft 12 about its axis to the turning output shaft 24. Accordingly, the electromagnetic clutch 31 is disposed between a fixing member 32a at the upper end of the cable 32 and the lower end of the steering input shaft 12. Further, an electromagnetic clutch 33 is disposed between a fixing member 32b at the lower end of the cable 32 and the upper end of the turning output shaft 24. Like the electromagnetic clutch 31, the electromagnetic clutch 33 enters a connected state when no electricity is supplied thereto so as to connect the cable 32 and the turning output shaft 24, to permit transmission of power therebetween, and enters a disconnected state when electricity is supplied thereto so as to disconnect the cable 32 and the turning output shaft 24, to thereby prevent transmission of power therebetween In the steering apparatus configured as described above, the checking ECU 45 sets the value of the anomalous flag MBF to "1" and outputs the value when both the electromagnetic clutches 31 and 33 have become anomalous and are each in an erroneously connected state. This operation is performed in consideration of the fact that when both the electromagnetic clutches 31 and 33 have become anomalous and are in an erroneously connected state, the steering input shaft 12, the cable 32, and the turning output shaft 24 are in a mechanically connected state, and self steer occurs. Meanwhile, when one of the electromagnetic clutches 31 and 33 or both the electromagnetic clutches 31 and 33 operate normally, the checking ECU 45 sets the value of the anomalous flag MBF to "0" and outputs the value. This operation is performed in consideration of the fact that when one of the electromagnetic clutches 31 and 33 or each of the electromagnetic clutches 31 and 33 is in a disconnected state, the steering input shaft 12, the cable 32, and the turning output shaft 24 are not connected at least mechanically (integrally), and self steer does not occur.

Even in the steering apparatus configured as described above, advantageous effects similar to those attained in the above-described embodiments and modifications are expected. Further, the degree of freedom in mounting the steering apparatus onto a vehicle can be secured well.

Moreover, the present invention is not limited to the above-described embodiments and modifications, and may be changed in various manners without departing from the purpose of the present invention.

For example, the above-described embodiments and modifications may be practiced in such a manner that when the checking ECU 45 determines that operation of the electromagnetic clutch 31 has become anomalous, the checking ECU 45 informs a driver of the anomaly of the electromagnetic clutch 31. Specifically, after determining that operation of the electromagnetic clutch 31 has become anomalous, the checking ECU 45 sets the anomalous flag MBF to "1" and causes, for example, a warning device to issue a warning. With this operation, the driver can know the operational anomaly of the electromagnetic clutch 31.

In the above-described embodiments and modifications, the steering wheel 11, which is rotated by a driver, is used to steer the vehicle. However, in place of the steering wheel, a joystick-type steering lever may be used, and a steering member of any type may be used as long as the member is operated by a driver so as to instruct steering of the vehicle.

In the above-described embodiments and modifications, the turning electric motor 22 linearly displaces the rack bar 21 to thereby turn the left and right front wheels FW1 and FW2. Alternatively, the above-described embodiments and modifications may be configured such that the turning electric motor 22 rotates the turning output shaft 24 to thereby turn the left and right front wheels FW1 and FW2.

The invention claimed is:

1. A steering-by-wire-type steering apparatus for a vehicle, comprising:
an input member connected to a steering wheel and displacing interlockedly with the steering wheel;
an output member connected to turnable wheels and displacing interlockedly with the turnable wheels;
a first electrical actuator connected to the input member and controlling displacement of the input member;
a second electrical actuator connected to the output member and controlling displacement of the output member;
a connecting-disconnecting device disposed between the input member and the output member, the connecting-disconnecting device operable in a disconnected state so as to separate the input member and the output member to thereby prevent power transmission therebetween, and in a connected state so as to connect the input member and the output member to thereby permit power transmission therebetween; and
anomaly detection means for detecting an anomaly of the connecting-disconnecting device on the basis of a predetermined operation quantity which is input to the input member as a result of operation of the steering wheel by a driver, the operation quantity changing in accordance with the relation of relative displacement between the input member and the output member in each of the connected state and the disconnected state of the connecting-disconnecting device.

2. A steering-by-wire-type steering apparatus for a vehicle according to claim 1, wherein the anomaly detection means detects an anomaly of the connecting-disconnecting device on the basis of an operation force with which the driver operates the steering wheel, the operation force being the operation quantity which is input by the driver to the input member via the steering wheel, and changing in accordance with the relation of relative displacement between the input member and the output member.

3. A steering-by-wire-type steering apparatus for a vehicle according to claim 2, wherein the anomaly detection means comprises:
displacement amount detection means for detecting a displacement amount of the input member which displaces in accordance with operation of the steering wheel by the driver;
operation force detection means for detecting the operation force which is input by the driver to the input member via the steering wheel;
displacement amount determination means for determining whether or not the displacement amount detected by the displacement amount detection means is equal to or less than a previously set, predetermined displacement amount;
stop control means for stopping operation of the second electrical actuator connected to the output member when the displacement amount determination means determines that the detected displacement amount is equal to or less than the predetermined displacement amount;
operation force determination means for determining whether or not the operation force detected by the operation force detection means in a state where the operation of the second electrical actuator is stopped by the stop control means is greater than a target operation force previously set in accordance with the relation of relative displacement between the input member and the output member; and
anomaly determination means for determining an anomaly of the connecting-disconnecting device on the basis of results of the determination by the operation force determination means.

4. A steering-by-wire-type steering apparatus for a vehicle according to claim 1, further comprising:
actuator operation control means, operable when the anomaly detection means detects an anomaly which maintains the connecting-disconnecting device in a connected state, for stopping the operation of the second electrical actuator and for operating and controlling the first electrical actuator so as to assist the operation of the steering wheel by the driver.

5. A steering-by-wire-type steering apparatus for a vehicle, comprising:
an input member connected to a steering wheel and displacing interlockedly with the steering wheel;
an output member connected to turnable wheels and displacing interlockedly with the turnable wheels;
a first electrical actuator connected to the input member and controlling displacement of the input member;
a second electrical actuator connected to the output member and controlling displacement of the output member;
a connecting-disconnecting device disposed between the input member and the output member, the connecting-disconnecting device operable in a disconnected state so as to separate the input member and the output member to thereby prevent power transmission therebetween, and in a connected state so as to connect the input member and the output member to thereby permit power transmission therebetween; and
anomaly detection means for detecting an anomaly of the connecting-disconnecting device on the basis of at least one state quantity related to displacement due to operation of the steering wheel by a driver which represents a connected state where power generated upon operation of the second electrical actuator is transmitted to the input member via the output member.

6. A steering-by-wire-type steering apparatus for a vehicle according to claim 5, wherein the anomaly detection means comprises:
displacement amount detection means for detecting a displacement amount of the input member;
calculation means for calculating, as the at least one state quantity, at least one of a displacement speed and a displacement acceleration of the input member from the displacement amount detected by the displacement amount detection means, the displacement speed representing a value obtained by differentiating the detected displacement amount with respect to time, and the displacement acceleration representing a value obtained by differentiating the displacement speed with respect to time;
determination means for determining whether or not at least one of the displacement speed and the displacement acceleration calculated by the calculation means is equal to or greater than a previously set predetermined value; and
anomaly determination means for determining an anomaly of the connecting-disconnecting device on the basis of results of the determination by the determination means.

7. A steering-by-wire-type steering apparatus for a vehicle according to claim 5, wherein the anomaly detection means comprises:
external force detection means for detecting, as the at least one state quantity, an external force input to the input member;
external force change determination means for determining whether or not the external force detected by the external force detection means has sharply decreased; and
anomaly determination means for determining an anomaly of the connecting-disconnecting device on the basis of results of the determination by the external force change determination means.

8. A steering-by-wire-type steering apparatus for a vehicle according to claim 5, wherein the anomaly detection means comprises:
displacement amount detection means for detecting a displacement amount of the input member;
operation force detection means for detecting, as the at least one state quantity, an operation force input by the driver to the input member via the steering wheel;
input direction determination means for determining whether or not a displacement direction of the input member and an input direction of the detected operation force differ from each other; and
anomaly determination means for determining an anomaly of the connecting-disconnecting device on the basis of results of the determination by the input direction determination means.

9. A steering-by-wire-type steering apparatus for a vehicle according to claim 5, wherein the anomaly detection means comprises:
displacement amount detection means for detecting a displacement amount of the input member as the at least one state quantity;
turning amount detection means for detecting a turning amount of the turnable wheels as a second state quantity; and
anomaly determination means for determining an anomaly of the connecting-disconnecting device on the basis of the displacement amount of the input member detected by the displacement amount detection means and the turning amount of the turnable wheels detected by the turning amount detection means.

10. A steering-by-wire-type steering apparatus for a vehicle according to claim 5, wherein the anomaly detection means comprises:
displacement amount detection means for detecting a displacement amount of the input member;
displacement speed calculation means for calculating, as the at least one state quantity, a displacement speed of the input member from the displacement amount of the input member detected by the displacement amount detection means, the displacement speed representing a value obtained by differentiating the displacement amount with respect to time;
turning amount detection means for detecting a turning amount of the turnable wheels;
turning speed calculation means for calculating, as a second state quantity, a turning speed of the turnable wheels from the turning amount of the turning wheels detected by the turning amount detection means, the turning speed representing a value obtained by differentiating the turning amount with respect to time; and
anomaly determination means for determining an anomaly of the connecting-disconnecting device on the basis of the displacement speed of the input member calculated by the displacement speed calculation means and the turning speed of the turnable wheels calculated by the turning speed calculation means.

11. A steering-by-wire-type steering apparatus for a vehicle according to claim 5, wherein the anomaly detection means comprises:
displacement amount detection means for detecting a displacement amount of the input member;
displacement acceleration calculation means for calculating, as the at least one state quantity, a displacement acceleration of the input member from the displacement amount of the input member detected by the displacement amount detection means, the displacement acceleration representing a value obtained by differentiating the displacement amount two times with respect to time;

turning amount detection means for detecting a turning amount of the turnable wheels;

turning acceleration calculation means for calculating, as a second state quantity, a turning acceleration of the turning wheels from the turning amount of the turnable wheels detected by the turning amount detection means, the turning acceleration representing a value obtained by differentiating the turning amount two times with respect to time; and anomaly determination means for determining an anomaly of the connecting-disconnecting device on the basis of the displacement acceleration of the input member calculated by the displacement acceleration calculation means and the turning acceleration of the turnable wheels calculated by the turning acceleration calculation means.

12. A steering-by-wire-type steering apparatus for a vehicle according to claim 5, wherein the anomaly detection means comprises:

displacement amount detection means for detecting a displacement amount of the input member;

target turning amount calculation means for calculating a target turning amount of the turnable wheels by use of the displacement amount detected by the displacement amount detection means;

turning amount detection means for detecting an actual turning amount of the turnable wheels;

difference calculation means for calculating, as the at least one state quantity, a difference between the target turning amount calculated by the target turning amount calculation means and the actual turning amount detected by the turning amount detection means; and anomaly determination means for determining an anomaly of the connecting-disconnecting device on the basis of the difference calculated by the difference calculation means.

13. A steering-by-wire-type steering apparatus for a vehicle according to claim 5, further comprising:

actuator operation control means, operable when the anomaly detection means detects an anomaly which maintains the connecting-disconnecting device in a connected state, for stopping the operation of the second electrical actuator and for operating and controlling the first electrical actuator so as to assist the operation of the steering wheel by the driver.

* * * * *